(12) United States Patent
Ganjam et al.

(10) Patent No.: US 9,819,566 B1
(45) Date of Patent: Nov. 14, 2017

(54) DYNAMIC CLIENT LOGGING AND REPORTING

(75) Inventors: Aditya R. Ganjam, Mountain View, CA (US); Ningning Hu, Santa Clara, CA (US); Asad K. Awan, San Francisco, CA (US); George C. Necula, Oakland, CA (US); Ion Stoica, Piedmont, CA (US)

(73) Assignee: Conviva Inc., Foster City, CA (US)

( * ) Notice: Subject to any disclaimer, the term of this patent is extended or adjusted under 35 U.S.C. 154(b) by 1019 days.

(21) Appl. No.: 13/461,346

(22) Filed: May 1, 2012

Related U.S. Application Data

(63) Continuation-in-part of application No. 12/780,784, filed on May 14, 2010, now Pat. No. 8,874,725, which is a continuation-in-part of application No. 11/897,957, filed on Aug. 30, 2007.

(60) Provisional application No. 60/859,428, filed on Nov. 15, 2006, provisional application No. 61/227,066, filed on Jul. 20, 2009, provisional application No. 61/339,925, filed on Mar. 10, 2010, provisional application No. 61/481,554, filed on May 2, 2011.

(51) Int. Cl.
*G06F 15/173* (2006.01)
*H04L 12/26* (2006.01)

(52) U.S. Cl.
CPC .............. *H04L 43/16* (2013.01); *H04L 43/08* (2013.01)

(58) Field of Classification Search
CPC .......... H04L 43/02; H04L 43/04; H04L 43/06
USPC ................................................. 709/223–225
See application file for complete search history.

(56) References Cited

U.S. PATENT DOCUMENTS

| 5,926,204 | A | 7/1999 | Mayer |
| 5,930,473 | A | 7/1999 | Teng et al. |
| 6,006,264 | A | 12/1999 | Colby et al. |
| 6,026,077 | A | 2/2000 | Iwata |
| 6,208,977 | B1 | 3/2001 | Hernandez |
| 6,223,206 | B1 | 4/2001 | Dan et al. |
| 6,279,039 | B1 | 8/2001 | Bhat |
| 6,324,565 | B1 | 11/2001 | Holt, III |
| 6,405,251 | B1 | 6/2002 | Bullard |
| 6,438,592 | B1 * | 8/2002 | Killian ............... H04L 41/22 709/203 |
| 6,469,991 | B1 | 10/2002 | Chuah |
| 6,735,630 | B1 | 5/2004 | Gelvin |
| 6,754,833 | B1 | 6/2004 | Black |
| 6,836,691 | B1 * | 12/2004 | Stirton .................. G05B 17/02 700/108 |
| 6,892,236 | B1 * | 5/2005 | Conrad ............... G06F 11/3409 709/203 |

(Continued)

OTHER PUBLICATIONS

Wade Roush, "TR10: Peering into Video's Future", Mar. 12, 2007.

(Continued)

*Primary Examiner* — Duyen Doan
(74) *Attorney, Agent, or Firm* — Van Pelt, Yi & James LLP

(57) ABSTRACT

Controlling dynamic reporting of content distribution performance information from a client is disclosed. The content distribution performance information associated with the delivery of content is generated. The content distribution performance information is reported to a content distribution monitor at a first reporting level. In response to a triggering event, the first reporting level is changed to a second reporting level. Additional content distribution performance information is reported according to the second reporting level.

16 Claims, 7 Drawing Sheets

(56) References Cited

U.S. PATENT DOCUMENTS

| | | |
|---|---|---|
| 6,906,743 B1 | 6/2005 | Maurer |
| 6,920,580 B1 | 7/2005 | Cramer et al. |
| 6,950,855 B2 | 9/2005 | Sampathkumar |
| 7,006,666 B2 | 2/2006 | Montgomery |
| 7,010,598 B2 | 3/2006 | Sitaraman et al. |
| 7,020,082 B2 | 3/2006 | Bhagavath |
| 7,024,468 B1 | 4/2006 | Meyer |
| 7,092,696 B1 | 8/2006 | Hosain |
| 7,139,834 B1 | 11/2006 | Albanese |
| 7,222,190 B2 | 5/2007 | Klinker |
| 7,277,896 B2 | 10/2007 | Matsubara |
| 7,313,087 B2 | 12/2007 | Patil et al. |
| 7,318,107 B1 | 1/2008 | Menon |
| 7,356,341 B2 | 4/2008 | Nanda |
| 7,373,415 B1 | 5/2008 | DeShan |
| 7,389,537 B1 | 6/2008 | Callon et al. |
| 7,487,509 B2 | 2/2009 | Hugly et al. |
| 7,490,136 B2 | 2/2009 | Suzuki |
| 7,509,372 B2 | 3/2009 | Dutta et al. |
| 7,519,703 B1 | 4/2009 | Stuart et al. |
| 7,593,333 B2 | 9/2009 | Li et al. |
| 7,599,698 B2 * | 10/2009 | Cheng .................... H04W 8/24 455/450 |
| 7,620,848 B1 | 11/2009 | Tanner |
| 7,627,872 B2 | 12/2009 | Hebeler et al. |
| 7,668,761 B2 | 2/2010 | Jenkins et al. |
| 7,668,914 B2 | 2/2010 | Parker et al. |
| 7,698,460 B2 | 4/2010 | Zhang et al. |
| 7,721,292 B2 | 5/2010 | Frasier et al. |
| 7,725,576 B2 | 5/2010 | Sitaraman et al. |
| 7,813,326 B1 | 10/2010 | Kelm |
| 7,844,491 B1 | 11/2010 | Haitsuka et al. |
| 7,873,727 B2 | 1/2011 | Pal et al. |
| 7,904,580 B2 | 3/2011 | Mandera et al. |
| 7,921,215 B2 | 4/2011 | Dessart |
| 7,921,222 B2 | 4/2011 | Courtemanche |
| 7,930,347 B2 | 4/2011 | Maxwell et al. |
| 7,941,823 B2 | 5/2011 | Hasek |
| 7,969,987 B1 | 6/2011 | Hansen et al. |
| 7,970,402 B2 | 6/2011 | Wu et al. |
| 8,028,159 B2 | 9/2011 | Li |
| 8,038,535 B2 | 10/2011 | Jensen |
| 8,046,765 B2 | 10/2011 | Cherkasova et al. |
| 8,108,403 B2 | 1/2012 | Gopalraj et al. |
| 8,156,204 B2 | 4/2012 | Leblanc et al. |
| 8,182,326 B2 | 5/2012 | Speer et al. |
| 8,230,105 B2 | 7/2012 | Melnyk et al. |
| 8,259,597 B1 | 9/2012 | Oak |
| 8,370,887 B2 | 2/2013 | Virdi et al. |
| 8,374,929 B1 | 2/2013 | Lappas et al. |
| 8,417,797 B2 | 4/2013 | Thoen |
| 8,489,683 B2 | 7/2013 | Leblanc et al. |
| 8,639,553 B1 | 1/2014 | Knauth et al. |
| 8,751,605 B1 | 6/2014 | Zhang |
| 8,751,679 B2 | 6/2014 | Mchugh |
| 8,843,597 B2 | 9/2014 | Leblanc et al. |
| 8,874,725 B1 | 10/2014 | Ganjam et al. |
| 8,924,996 B2 | 12/2014 | Shafiee |
| 2002/0002708 A1 | 1/2002 | Arye |
| 2002/0016831 A1 | 2/2002 | Peled |
| 2002/0082730 A1 | 6/2002 | Capps et al. |
| 2002/0095400 A1 | 7/2002 | Johnson |
| 2002/0126135 A1 | 9/2002 | Ball |
| 2002/0175934 A1 | 11/2002 | Hand |
| 2002/0183972 A1 | 12/2002 | Enck |
| 2002/0184357 A1 | 12/2002 | Traversat et al. |
| 2002/0198984 A1 * | 12/2002 | Goldstein ............ G06F 11/323 709/224 |
| 2003/0046383 A1 | 3/2003 | Lee et al. |
| 2003/0046396 A1 | 3/2003 | Richter |
| 2003/0046704 A1 | 3/2003 | Laksono et al. |
| 2003/0046708 A1 | 3/2003 | Jutzi |
| 2003/0050966 A1 | 3/2003 | Dutta |
| 2003/0051051 A1 | 3/2003 | O'Neal et al. |
| 2003/0061305 A1 * | 3/2003 | Copley ............ H04L 29/06027 709/217 |
| 2003/0065739 A1 | 4/2003 | Shnier |
| 2003/0065763 A1 | 4/2003 | Swildens et al. |
| 2003/0074142 A1 | 4/2003 | Steeg et al. |
| 2003/0084003 A1 | 5/2003 | Pinkas |
| 2003/0135593 A1 | 7/2003 | Lee et al. |
| 2003/0140108 A1 | 7/2003 | Sampathkumar |
| 2003/0145066 A1 | 7/2003 | Okada |
| 2003/0169863 A1 | 9/2003 | Hernandez |
| 2004/0019675 A1 | 1/2004 | Hebeler et al. |
| 2004/0047354 A1 | 3/2004 | Slater |
| 2004/0049793 A1 | 3/2004 | Chou |
| 2004/0064556 A1 | 4/2004 | Zhang |
| 2004/0088347 A1 | 5/2004 | Yeager et al. |
| 2004/0093155 A1 | 5/2004 | Simonds |
| 2004/0107387 A1 * | 6/2004 | Larsson .............. G06F 11/0775 714/39 |
| 2004/0133471 A1 | 7/2004 | Pisaris-Henderson et al. |
| 2004/0136327 A1 | 7/2004 | Sitaraman et al. |
| 2004/0158643 A1 | 8/2004 | Suzuki |
| 2004/0162901 A1 | 8/2004 | Mangipudi |
| 2004/0233918 A1 | 11/2004 | Larsson |
| 2004/0236846 A1 | 11/2004 | Alvarez et al. |
| 2004/0267691 A1 | 12/2004 | Vasudeva |
| 2005/0021715 A1 * | 1/2005 | Dugatkin ................ H04L 43/12 709/223 |
| 2005/0060158 A1 | 3/2005 | Endo et al. |
| 2005/0076104 A1 | 4/2005 | Liskov et al. |
| 2005/0086300 A1 | 4/2005 | Yeager |
| 2005/0086469 A1 | 4/2005 | Dunagan |
| 2005/0120131 A1 | 6/2005 | Allen |
| 2005/0169179 A1 | 8/2005 | Antal |
| 2005/0243735 A1 | 11/2005 | Kashima |
| 2005/0251835 A1 | 11/2005 | Scott et al. |
| 2006/0052100 A1 | 3/2006 | Almgren |
| 2006/0059248 A1 | 3/2006 | Ikeda |
| 2006/0075094 A1 | 4/2006 | Wen et al. |
| 2006/0085246 A1 | 4/2006 | Li |
| 2006/0123080 A1 | 6/2006 | Baudino et al. |
| 2006/0135172 A1 | 6/2006 | Dronne |
| 2006/0136218 A1 | 6/2006 | Lee |
| 2006/0136597 A1 | 6/2006 | Shabtai |
| 2006/0168304 A1 | 7/2006 | Bauer |
| 2006/0179154 A1 | 8/2006 | Sitaraman et al. |
| 2006/0190615 A1 | 8/2006 | Panwar et al. |
| 2006/0206539 A1 * | 9/2006 | Thompson .......... G06F 11/0748 |
| 2006/0236017 A1 | 10/2006 | Rooholamini |
| 2006/0246880 A1 | 11/2006 | Baldwin et al. |
| 2006/0259949 A1 | 11/2006 | Schaefer et al. |
| 2006/0285489 A1 | 12/2006 | Francisco |
| 2007/0005809 A1 | 1/2007 | Kobayashi |
| 2007/0025381 A1 | 2/2007 | Feng |
| 2007/0066403 A1 | 3/2007 | Conkwright |
| 2007/0101202 A1 | 5/2007 | Garbow |
| 2007/0136311 A1 | 6/2007 | Kasten |
| 2007/0140113 A1 | 6/2007 | Gemelos |
| 2007/0150612 A1 | 6/2007 | Chaney et al. |
| 2007/0183427 A1 | 8/2007 | Nylander et al. |
| 2007/0204011 A1 | 8/2007 | Shaver |
| 2007/0232332 A1 | 10/2007 | Holur |
| 2007/0282994 A1 | 12/2007 | Beers et al. |
| 2007/0286351 A1 * | 12/2007 | Ethier .................... H04L 65/80 379/32.01 |
| 2007/0288638 A1 | 12/2007 | Vuong |
| 2008/0016205 A1 | 1/2008 | Svendsen |
| 2008/0037438 A1 | 2/2008 | Twiss et al. |
| 2008/0046499 A1 | 2/2008 | Cabrera |
| 2008/0046777 A1 | 2/2008 | Chen et al. |
| 2008/0049616 A1 | 2/2008 | Kamath et al. |
| 2008/0049786 A1 | 2/2008 | Ram et al. |
| 2008/0096562 A1 | 4/2008 | Wu |
| 2008/0104454 A1 | 5/2008 | White |
| 2008/0112315 A1 | 5/2008 | Hu et al. |
| 2008/0140688 A1 | 6/2008 | Clayton et al. |
| 2008/0141131 A1 | 6/2008 | Cerny et al. |
| 2008/0144513 A1 | 6/2008 | Small et al. |
| 2008/0151821 A1 | 6/2008 | Cho |
| 2008/0155586 A1 | 6/2008 | Yang et al. |

(56) References Cited

U.S. PATENT DOCUMENTS

| | | |
|---|---|---|
| 2008/0209499 A1 | 8/2008 | Ramesh et al. |
| 2008/0235746 A1 | 9/2008 | Peters et al. |
| 2008/0247326 A1 | 10/2008 | Cormier et al. |
| 2008/0305801 A1 | 12/2008 | Burgess et al. |
| 2008/0313040 A1 | 12/2008 | Rose et al. |
| 2009/0010155 A1 | 1/2009 | Liu |
| 2009/0019503 A1 | 1/2009 | Vorbau |
| 2009/0043906 A1 | 2/2009 | Hurst et al. |
| 2009/0059812 A1 | 3/2009 | Chinnaswamy |
| 2009/0082020 A1 | 3/2009 | Ch'ng et al. |
| 2009/0083631 A1 | 3/2009 | Sidi et al. |
| 2009/0106392 A1 | 4/2009 | Zuckerman |
| 2009/0117893 A1 | 5/2009 | Weigand |
| 2009/0119722 A1 | 5/2009 | VerSteeg et al. |
| 2009/0125625 A1 | 5/2009 | Shim et al. |
| 2009/0150487 A1 | 6/2009 | Wolfish et al. |
| 2009/0164656 A1 | 6/2009 | Guan |
| 2009/0172200 A1 | 7/2009 | Morrison et al. |
| 2009/0187956 A1 | 7/2009 | Sommer |
| 2009/0192929 A1 | 7/2009 | Hoeflinger et al. |
| 2009/0234940 A1 | 9/2009 | Pal et al. |
| 2009/0248872 A1 | 10/2009 | Luzzatti |
| 2009/0271101 A1 | 10/2009 | Relyea |
| 2009/0328124 A1 | 12/2009 | Khouzam et al. |
| 2010/0043014 A1 | 2/2010 | Hebeler et al. |
| 2010/0080290 A1 | 4/2010 | Mehrotra |
| 2010/0088373 A1 | 4/2010 | Pinkham |
| 2010/0100635 A1 | 4/2010 | Takemura et al. |
| 2010/0131642 A1 | 5/2010 | Chalikouras et al. |
| 2010/0138273 A1 | 6/2010 | Bateni et al. |
| 2010/0161729 A1 | 6/2010 | Leblanc et al. |
| 2010/0169195 A1 | 7/2010 | Trest |
| 2010/0235503 A1 | 9/2010 | Sitaraman et al. |
| 2010/0302002 A1 | 12/2010 | Guo |
| 2011/0014972 A1 | 1/2011 | Herrmann et al. |
| 2011/0016225 A1 | 1/2011 | Park et al. |
| 2011/0058675 A1 | 3/2011 | Brueck et al. |
| 2011/0060649 A1 | 3/2011 | Dunk et al. |
| 2011/0179435 A1 | 7/2011 | Cordray et al. |
| 2011/0258049 A1 | 10/2011 | Ramer et al. |
| 2012/0093098 A1 | 4/2012 | Charbit et al. |
| 2012/0204068 A1* | 8/2012 | Ye .................. G06F 11/0709 714/57 |
| 2012/0231885 A1 | 9/2012 | Speer, II et al. |
| 2013/0124724 A1 | 5/2013 | Madgwick |
| 2013/0151687 A1 | 6/2013 | Mooneyham |
| 2015/0095704 A1 | 4/2015 | Sokolik et al. |

OTHER PUBLICATIONS

Androutsellis et al., "A Survey of Peer-to-Peer Content Distribution Technologies", ACM Computing Surveys, vol. 36, No. 4, Dec. 2004, pp. 335-371.

Theotokis et al., "A Survey of Peer-to-Peer Content Distribution Technologies", ACM Computing Surveys, vol. 36, No. 4, Dec. 2004, pp. 335-371.

"Relay Nodes in Wireless Sensor Networks: A Survey" —Ataul Bari, University of Windsor, Nov. 2005, http://richard.myweb.cs.uwindsor.ca/cs510/survey_bari.pdf.

"Simple Opportunistic Routing Protocol for Wireless Mesh Networks"—Rozner et al, University of Texas at Austin, Aug. 2011 http://ericrozner.com/papers/wimesh06.pdf.

http://www.cs.berkeley.edu/~kubitron/articles/techreview.pdf "The Internet Reborn" —Wade Roush, Technology Review, Oct. 2003.

* cited by examiner

DYNAMIC CLIENT LOGGING AND REPORTING

CROSS REFERENCE TO OTHER APPLICATIONS

This application is a continuation-in-part of co-pending U.S. patent application Ser. No. 12/780,784 entitled MONITORING THE PERFORMANCE OF A CONTENT PLAYER filed May 14, 2010. Application Ser. No. 12/780,784 is a continuation-in-part of co-pending U.S. patent application Ser. No. 11/897,957 entitled REASSIGNING SOURCE PEERS filed Aug. 30, 2007, which claims priority to U.S. Provisional Patent Application No. 60/859,428 entitled CONTENT DISTRIBUTION filed Nov. 15, 2006. application Ser. No. 12/780,784 also claims priority to U.S. Provisional Patent Application No. 61/227,066 entitled REAL-TIME TELEMETRY FOR CONTENT filed Jul. 20, 2009 and to U.S. Provisional Patent Application No. 61/339,925 entitled TELEMETRY FOR CONTENT filed Mar. 10, 2010.

This application also claims priority to U.S. Provisional Patent Application No. 61/481,554 entitled DYNAMIC CLIENT LOGGING filed May 2, 2011.

All of the aforementioned applications are incorporated herein by reference for all purposes.

BACKGROUND OF THE INVENTION

Users are increasingly accessing content, such as video files and live streaming/video on demand content, via the Internet. When problems arise in that content distribution, it would be desirable to have access to detailed information from the users' clients. Unfortunately, at the scale of potentially millions of concurrent clients, it is infeasible to send complete logging information from all clients at all times.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
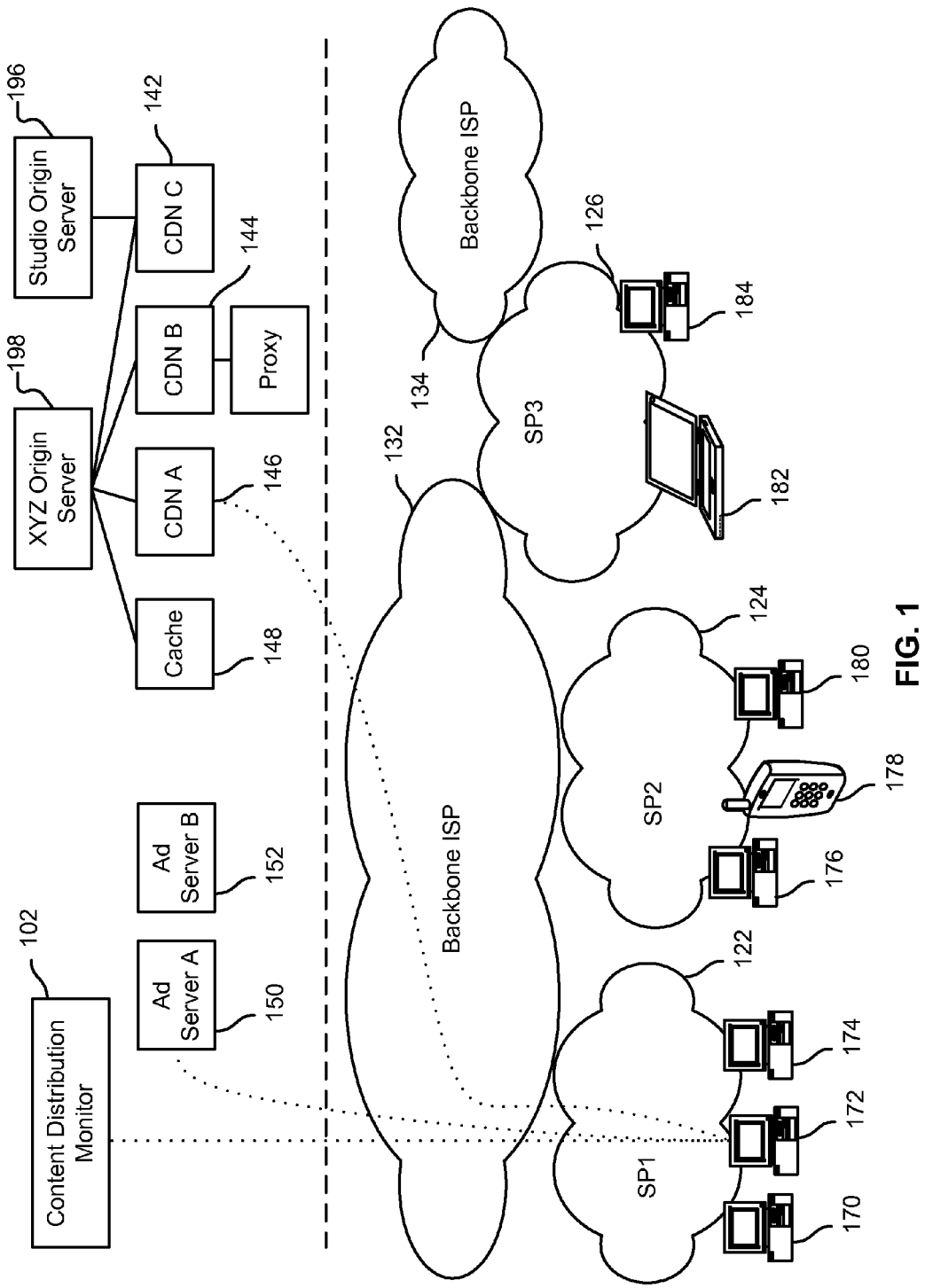
FIG. 1 is an illustration of an environment in which content is distributed.

FIG. 1 is an illustration of an environment in which content is distributed. In the example shown, clients 170-184 are used to access content, such as audiovisual content (e.g., movies, songs, television shows, sporting events, games, images, etc.) that is owned by content owners. The content is stored (or captured) at origin servers 196-198, then distributed via other servers, caches, content distribution networks (CDNs), proxies, etc. (collectively, "content sources"). Content sources employ a variety of technologies and include HTTP, Adobe Flash Media, and Microsoft Internet Information Service servers. In some embodiments content is also distributed by clients (e.g., using peer-to-peer techniques).

Examples of clients include personal computers (170), laptops (182), cellular phones/personal digital assistants (178), and other types of information appliances (not shown), such as set-top boxes, game consoles, broadband routers, file servers, video servers, and digital video recorders, as applicable. The clients shown are used by subscribers to various Internet service providers (ISPs). For example, clients 170, 172, and 174 are subscribed to SP1 (122), while clients 176, 178, and 180 are subscribed to SP2 (124), and clients 182 and 184 are subscribed to SP3 (126).

In the example shown, a movie studio ("Studio") has contracted with content distributor 142 to provide downloadable copies of its films in exchange for a fee. Similarly, a television network ("XYZ") has contracted with content distributors 142-146 to provide viewers with access to live streams of its broadcasts as well as streams of television show episodes and sporting events. In some cases, the content distributor is owned/operated by the content owner.

Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134. Advertisements are served to various clients via ad servers 150-152.

Suppose a user of client 172 (hereinafter "Alice") would like to watch a live soccer game owned by XYZ. Client 172 includes a web browser application. Alice uses the web browser application to navigate to a portal owned by XYZ, such as "http://xyztvnetwork.com/livegames." Her request for the game is directed to a CDN node that is closest to her. In this case, CDN 146 is the fewest hops away from her client. Her client then begins streaming the content from CDN 146, which is in turn rendered in her browser (e.g., via a Flash or Silverlight player). Advertisements, associated with the portal, are served to her by ad server 150.

In addition to CDN 146 and ad server 150, Alice's client is also in communication with content distribution monitor 102. As will be described in more detail below, client 172 provides status information (also referred to variously herein as a "heartbeat," as "content distribution performance information," "telemetry information," and "log information"), on a recurring basis, to content distribution monitor 102.

The status information includes a variety of telemetry data such as information that captures the quality of the user experience (e.g., video stream quality), and information pertaining to user behavior. Examples of quality metrics include: failed connection attempts, the length of time it takes for the soccer game video to start playing, the number of buffering events (if any), the length of buffering events, the number of frames per second rendered by the video player, and premature connection terminations. Examples of user behavior include: starting and stopping playing a video or audio stream, seeking within the stream, switching the player to full screen mode, minimizing/restoring the player, a change in the volume level of the player, and clicking on an advertisement.

As other users of clients 170-184 request content, their respective players similarly obtain content from content sources such as CDN 144, communicate status information to content distribution monitor 102, and receive commands. Such players may be browser-based as with Alice's, or they may be standalone applications, as applicable. In various embodiments, all clients in the environment provide status information to content distribution monitor 102.

Different clients can provide content distribution monitor 102 with different levels of detail, and can also do so with differing frequency. For example, client 178 is a smartphone with less powerful hardware than client 172 and more limited bandwidth. It is configured to provide less information to content distribution monitor 102 than client 172 and also does so less frequently than client 172. As will be described in more detail below, a given client can also be configured to dynamically adjust the amount of information it collects, the amount of information it sends, and the frequency with which the information is sent.

Content distribution monitor 102 collects and processes the information received from Alice's client along with other clients. The collected information is made available in real-time to control entities/operators and can be used to detect and remedy problems in the content distribution. Examples of such problems include excessive buffering, freezing, and frame skipping. Additional information pertaining to delivery resources (e.g., CDN 142) and network providers (e.g., ISP 126) is also made available, as is other information pertaining to clients such as demographic information.

In the example shown in FIG. 1, a single content distribution monitor 102 is used. Portions of content distribution monitor 102 may be provided by and/or replicated across various other modules or infrastructure depending, for example, on factors such as scalability and availability (reducing the likelihood of having a single point of failure), and the techniques described herein may be adapted accordingly. In some embodiments content distribution monitor 102 is implemented across a set of machines distributed among several data centers. A Resilience Service Layer (RSL) can also be used to ensure that the monitoring service is not disrupted when/if a subset of machines fail or a subset of data centers hosting the content distribution monitor are disconnected from the Internet. In some embodiments entities such as the operator of CDN 142 run their own content distribution monitors 102. In such cases, the content distribution monitor may provide a subset of the functionality described herein, such as by detecting, predicting, and/or remediating content delivery problems with respect to the servers that comprise the CDN.

Examples of Client Architecture

In various embodiments, collection of status information and reporting of that information to the content distribution manager is performed by a "monitoring module" included in the client. The monitoring module can also receive commands, such as from content distribution monitor 102 to adjust a level or frequency of reporting.

Figure 2A:
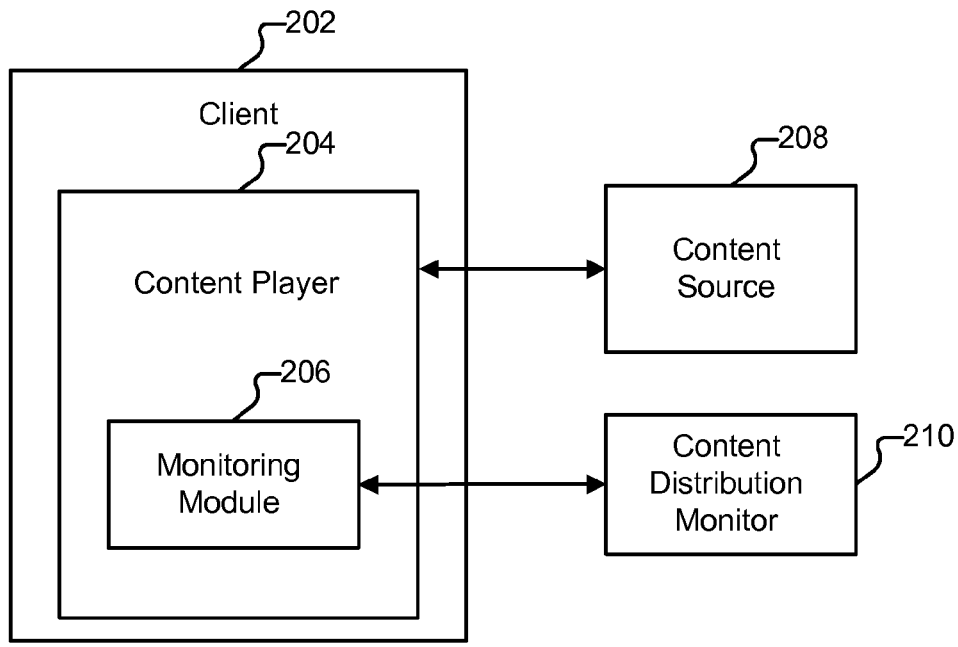
FIG. 2A illustrates an embodiment of a client.

FIG. 2A illustrates an embodiment of a client. In the example shown, client 202 includes a content player application 204 which in turn incorporates monitoring module 206. Content is received by the player from content source 208. Monitoring module 206 is in communication with content distribution monitor 210.

In the example shown, module 206 is implemented in ActionScript and deployed as an SWF library that is dynamically loaded by player 204. In Flash, the NetStream( ) class is mainly responsible for streaming, buffering, and playing the video. The monitor is implemented as an element in the content player which wraps the video element, and provides the same interface as the video element.

Module 206 can also be implemented using other approaches, such as in the .NET platform for Silverlight and deployed as a DLL library that is dynamically loaded by player application 204. In Silverlight, the MediaElement( ) class is mainly responsible for streaming, buffering, and playing the video. The monitor is implemented as an element in the content player which wraps the video element, and provides the same interface as the video element.

Examples of some of the information collected by monitoring module 206 include the following, expressed in key-value pairs:

(player_state, "buffering"): The stream is buffering.
(buffer_length, 5s): The current buffer length is five seconds.
(join_time, 3s): The join time was 3 sec.
(frame_per_second, 30): The number of frames per second is 30.
(player-mode, "Full Screen"): The player is running in full-screen mode.

Figure 2B:
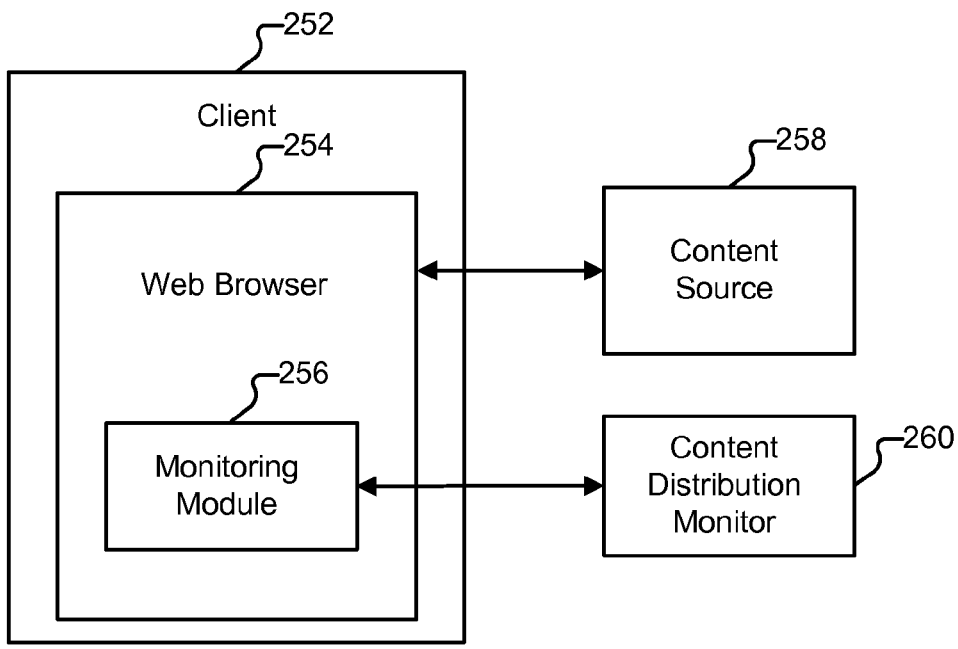
FIG. 2B illustrates an embodiment of a client.

FIG. 2B illustrates an embodiment of a client. In the example shown, client 252 includes a web browser application 254 which in turn incorporates monitoring module 256. Content is received by the player from content source 258. Monitoring module 256 is in communication with content distribution monitor 260. In the example shown, module 256 is implemented in JavaScript. The monitor periodically collects information about the current web page and the browser. Examples of some of the information collected by monitoring module 256 include the following, expressed in key, value pairs:

(browser_minimized, "yes"): The browser window is minimized.
(tab_visible, "no"): The tab containing the web page is not visible.
(pointer_pos, "x, y"): The position of the pointer on the web page.
(banner_display, "ACMECars"): The banner ad on the web page is for ACME Cars.

As explained above, the monitoring module can be implemented in a variety of ways. For example, the monitoring module can be included in the client's player by the author of the player. The monitoring module can also extend the functionality of an existing player, such as by being implemented as a plugin, library, or standalone application (e.g., a helper application). Various examples of techniques for integrating a monitoring module with an existing player will now be described.

In one embodiment, the monitoring module is a wrapper around the lowest level streamer module (e.g., "NetStream" in Flash, or "MediaElement" in Silverlight). The player uses the wrapper, which provides the same or enhanced version of the API provided by the streamer module, to stream video. Logic in the wrapper captures the appropriate telemetry data.

Example: "ConvivaNetStream" extends and wraps "NetStream":

var ns:NetStream=new ConvivaNetStream( )
ns.play(<stream>);

In a second embodiment, the monitoring module exists as a side attachment and is not present in the code path for streaming to occur. The player passes the streamer module to the monitoring module either directly or through a proxy module. The monitoring module reads properties and listens for events from the streamer module or proxy module to collect data. The proxy module method prevents the monitoring module from interfering with the streaming.

Example 1 var ns:NetStream=new NetStream( )
ns.play(<stream>);
LivePass.createMonitoringSession(ns);

Example 2. "NetStreamProxy" Wraps "NetStream," but Prohibits any Calls that May Adversely Impact "NetStream"

var ns:NetStream=new NetStream( )
var nsProxy:NetStreamProxy=new NetStreamProxy(ns);
ns.play(<stream>);
LivePass.createMonitoringSession(nsProxy);

In a third embodiment, the monitoring module is built into the streamer module. The player uses the streamer module. The monitoring module within collects data.

Example var ns:NetStream=new NetStream( )
ns.play(<stream>);

Additional Status Information Examples

As mentioned above, clients downloading/streaming content from content providers are also in communication with content distribution monitor 102 on a recurring, time-driven basis. In some embodiments, each heartbeat contains a snapshot of the session state at the time the heartbeat was sent out and a summary of the events and measurements since the last heartbeat or since the start of the session, as applicable. Examples of information that can be included in a heartbeat (though need not be present in every heartbeat) include the following:

version: The version of the heartbeat.
clientID: A unique identifier associated with the client's monitoring module (described in more detail below) when it is downloaded/installed on the client.
clientVersion: The version of the monitoring module.
customerID: An identifier associated with an entity such as XYZ or Studio.
sessionID: A unique identifier associated with the content viewing session.
objectID: A unique identifier associated with the content being streamed. In Alice's case, this is the soccer game.
currentResource: The source from which the content is currently being obtained. In Alice's case, this is CDN 146.
candidateResourceList: A list of potential sources from which the player can obtain the content. In Alice's case, this could include CDN 144, CDN 142, cache 148, etc. The "currentResource" is one resource in the "candidateResourceList."
resourceUsage: The number of bytes loaded/streamed since the start of the session.
currentBufferSize: The current buffer size.
minBufferSize: The minimum buffer size during the previous heartbeat interval.
maxBufferSize: The maximum buffer size during the previous heartbeat interval.
numBufferEmptyEvents: The number of buffering empty events since the previous heartbeat.
currentBitrate: The bitrate at which the content is currently streamed.
playheadTime: For video-on-demand content (i.e., not a live event), this is the time offset of the stream file.
currentlyPlaying: For live content, this is the time offset of the stream since the player started.
joinTime: The amount of time that it took the player to enter the player state for the session.
averageFPS: The average rendering frame per second (FPS) at which the content was rendered since the last heartbeat.
encodedFPS: The FPS at which the content was encoded.
averageFPS: Can be lower than the "encodedFPS" if the client's CPU is unable to render the content at the "encodedFPS" or if the client cannot stream the content fast enough.
totalPlayTime: The total play time since the beginning of the session.
totalBufferingTime: The total buffering time since the beginning of the session.
totalPauseTime: The total pause time since the beginning of the session.
totalSleepTime: The total sleep time since the beginning of the session.
The client is in a sleep state if the client is suspended.
sessionTime: The total time elapsed since the session started.
currentState: The state of the player when the heartbeat was sent. Examples of player states include: play, pause, buffering, joining, and seeking.
numRateSwitches: The number of bitrate switches since the beginning of the session.
numResourceSwitches: The number of resource switches since the beginning of the session.

rateSwitchingEvent.time: The time at which a bitrate switch was attempted, measured from the start of the session.

rateSwitchingEvent.from: The bitrate of the stream at the time the switch was attempted.

rateSwitchingEvent.to: The target bitrate of the switch.

rateSwitchingEvent.result: Indicates whether the switch was successful or not. For example, a switch may not succeed if the client cannot sustain the "rateSwitchingEvent.result" bitrate.

resourceSwitchingEvent.time: The time at which a resource switch was attempted, measured from the start of the session.

resourceSwitchingEvent.from: The resource from which the content was streamed at the time the switch was attempted.

resourceSwitchingEvent.to: The target resource for the switch.

resourceSwitchingEvent.results: Indicates whether the switch was successful or not.

errorList: A list of errors encountered from the start of the session.

Figure 3:
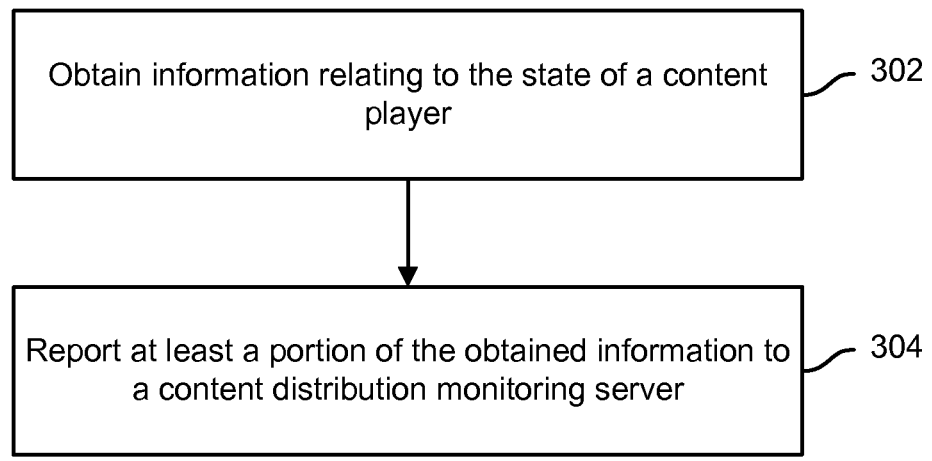
FIG. 3 illustrates an example of a process for monitoring the performance of a content player.

FIG. 3 illustrates an example of a process for monitoring the performance of a content player. In some embodiments the process shown in FIG. 3 is performed by a client such as client 172. The process begins at 302 when information relating to the state of a content player is obtained. For example, at 302, client 172 collects various information pertaining to the video player that Alice uses to watch the streaming soccer game. Information such as the amount of time an advertisement took to load and which ad server supplied the advertisement is also obtained. In some embodiments, additional processing is performed in the collected information. Examples include computing averages, minimums, maximums, and the $x^{th}$ percentile over the last few samples.

At 304, at least a portion of the obtained information is reported to a content distribution monitoring server. For example, at 304, client 172 sends a heartbeat to content distribution monitor 102, including some or all of the information collected at 302. Information sent at 304 can also include processed results such averages and minimums, instead of or in addition to raw data.

In various embodiments, the process shown in FIG. 3 repeats throughout a content playing session. The process may repeat regularly (e.g., once every second), and may also repeat with varying frequency.

The amount of data reported by the client in a heartbeat to content distribution monitor 102 can affect the scalability of the content distribution monitor. The amount of data collected and reported by the client can also potentially impact the performance of the client. If the client is otherwise resource constrained (e.g., due to other processes or due to hardware limitations), adjustments can be made as to how much information is collected and with what frequency. For example, suppose the buffer size is expected to be of size three seconds. The time period employed by the monitoring module can be set to one second or a few hundred milliseconds. The adjustment can be dynamically adjusted as needed. The period can be decreased if the buffer grows and increased if the buffer shrinks, thus minimizing overhead while still being able to detect a low buffer size which can impact the video quality.

The amount of data sent can also be adjusted. Two example parameters for doing so include: the heartbeat "period," and the size of heartbeats, both of which can be adaptively changed by the client, the content distribution monitor, or a combination of the client and the content distribution monitor, as needed. As one example, if the quality experienced by the client is acceptable, the client may reduce the heartbeat frequency. This can entail collecting state information less frequently and can also entail sending collected information less frequently. If the quality degrades, the client can increase the heartbeat frequency accordingly. As one example, client 172 can employ a rule that, as long as the buffering ratio is less than or equal to 0.5%, the heartbeat period is 30 seconds. If the buffering ratio is between 0.5% and 1%, the heartbeat period is adjusted to 20 seconds. If the buffering ratio is equal to or greater than 1%, the heartbeat period is adjusted to 10 seconds.

Content distribution monitor 102 can direct client 172 to increase or decrease the heartbeat frequency based on factors such as the current load on the content distribution monitor (or applicable component thereof). For example, if the load on content distribution monitor 102 exceeds a predefined threshold, clients are instructed to increase the heartbeat interval and/or reduce the detail of the information sent in a heartbeat. As one example, content distribution monitor 102 can employ a rule that, if its resource utilization exceeds 80%, clients are instructed to double their respective heartbeat intervals. Monitor 102 can also selectively send such instructions to clients. For example, clients with periods under 30 seconds can be instructed to double their periods, while clients with periods above 30 seconds are not sent such instructions. As another example, when monitor 102's utilization exceeds 80%, it can instruct clients to reduce heartbeat size by sending less information. This can be less detailed information (e.g., sending only the number of resource switches, instead of the detailed information about these switches), or can include aggregate measurements about certain events instead of sending individual details. If the client is already aggregating certain information, the measurements can be aggregated over a longer time interval (e.g., 10 seconds instead of 2 seconds). Additional examples follow.

Instead of sending every buffering event, send the aggregate time the session spent in the buffering state since the last heartbeat.

Instead of sending every measurement of the rendering rate, send the average over the entire heartbeat interval.

Instead of sending information about a switch event at the time when the switch event happened, store the event on the client and send it with the next heartbeat.

Additional discussion regarding the dynamic adjustment of data collection and reporting is provided below.

Inferring State Information

In some cases, the monitoring and reporting functionality described herein as being provided by a client is wholly integrated with the player itself. For example, Studio might make available a custom player application that can be installed on a client by users that want to watch Studio films. The custom player includes all of the necessary logic to provide complete heartbeat information, and also includes logic for communicating with the content distribution monitor, adjusting the frequency with which status information is communicated to the content distribution monitor, and other functionality described herein. However, depending on the player deployed on a client, not all of the example heartbeat information described above may be directly accessible for collection and transmission. For example, the Flash player plugin used by Alice to view the soccer game does not provide direct access to its state. Using the techniques described herein, content distribution monitor 102 can nonetheless be provided with the state of the player.

In some embodiments, a monitoring module is embedded in the content player deployed on the client. For example, when Alice directs her browser to XYZ's website, a custom Flash-based player is loaded. The custom player has direct access to the API of the video plugin. Possible states of the player are as follows:

Playing: The player's buffer is not empty, and the player renders frames on the screen.

Buffering: The player's buffer is either empty or is less than a predefined threshold, making it impossible for the player to render new frames.

Joining: The player has just connected and has not yet accumulated enough data in its buffer to start rendering frames.

Pause: The player is paused, usually as a result of a user action. During the pause state, no new frames are rendered even if the buffer is full.

Sleep: The client is suspended.

In the case of the aforementioned Flash player, NetStatus events provided by the player can be used to infer the state, as described below:

Buffering: When one of a NetStatus.Buffer.Empty, NetStream.Play.Start, or NetStream.Play.Reset events is received, an inference is made that the player is buffering data and the video is not playing. For live RTMP streams, the mentioned events might not be available. In that case, if the playhead time has stopped moving and there is no data in the content player buffer, an inference is made that the player is buffering data and the video is not playing.

Playing: When a NetStatus.Buffer.Full event is received, an inference is made that the player is playing video. If the player is currently in a Paused state and the playheadTime starts to move, an inference is made that the player is playing video.

Paused: If the playheadTime does not progress for 1.6 seconds, an inference is made that the player is paused.

Sleep: If the amount of time that has elapsed between two firings of a periodic one second timer is greater than 30 seconds, an inference is made that the client has been in a sleep mode since the last firing of the timer.

Stopped: For HTTP streams, when a NetStatus.Play.Stop event is received, an inference is made that the stream has ended. For RTMP streams, when a NetStatus.Play.Complete event is received, an inference is made that the stream has ended. When a NetStatus.Play.Stop is received, an inference is made that the download has finished, but the stream is still playing.

Error: If the stream stays in stopped state for fifteen seconds at the start of a session, an inference is made that it has failed to connect.

In addition to the player states described above, an additional state can also be inferred:

Zombie state: An inference is made that the player is in a zombie state (a non-operating state with no user actively using it) if it persists in a non-playing state for more than a specified time. Once the player is in a zombie state, the transmission of heartbeats to content distribution monitor 102 is halted. Reporting will resume if the player returns to a playing state. Non-playing states include: "Buffering," "Paused," "Stopped," and "Error."

In addition to the player states, the monitoring module monitors various metrics, including the number of bytes downloaded/streamed since the session started, the bitrate of the stream, and the rendering rate.

Some players, such as the Flash 9 plugin, do not provide a direct API from which the number of bytes streamed/downloaded or the stream bitrate. Nonetheless, a variety of techniques can be used to obtain or estimate the bitrate. As one example, the developer of the player might expose the bitrate through an API call.

Another technique for obtaining a bitrate is to use metadata associated with the content. For example, suppose metadata is made available through a configuration file associated to the content. The configuration resides on an origin server such as origin server 198 and also includes other information such as the title of the content, its genre, and a list of CDNs where the content is available.

Yet another technique for obtaining a bitrate is to examine the content URL. For example, a movie might be accessible at the URL http://www.CDN-C.com/Studio/JaneEyre300 Kbps. In this case, the bitrate of the content is likely to be 300 Kbps.

An estimation of the stream bitrate can also be made. The estimation, along with the amount of time the player was in the playing state, and the size of the buffer, are used to estimate the number of bytes downloaded/streamed. As one example, suppose a player streamed data at 400 Kbps, was in a playing state for 315 seconds, and at the time of taking the measurement the buffer size contained data for playing another 15 seconds. The total number of bytes downloaded is: 400 Kbps*(315 seconds+15 seconds)=16 MB.

In the event that the bitrate is available through multiple of the above techniques, in various embodiments each applicable approach is used, in a specified order, until a valid bitrate (e.g., greater than 0 and less than 10,000 kbps) is obtained.

The number of bytes downloaded can be estimated as (totalPlayTime+bufferLength)*bitrate. If multiple bitrates are used, in some embodiments the bytes downloaded is estimated as the sum of totalPlayTime[bitrate]*bitrate+bufferLength*currentBitrate.

Rendering quality is another example metric that can be obtained and provided to monitor 102. Rendering quality is the ratio between the frames per second (FPS) rendered by the player and the FPS at which the stream was encoded.

Some players do not directly provide the information needed to compute the rendering quality. For example, Flash 9 has an API that exposes rendered frames per second, but not encoded frames per second. One technique to compute the encoded FPS, in such a scenario, is as follows. The rendering FPS is measured and an assumption is made that the encoded FPS is the maximum FPS observed over the course of the session. Another technique is to estimate the encoded FPS as the maximum of a three second sliding average of rendered FPS sampled five times a second.

In order to ensure accurate accounting of the player status over the course of the session, it is important to determine the time intervals when the system is in sleep or suspend mode. These intervals can be detected using notification APIs provided by the system for this purpose. For systems that do not provide such API (e.g., Flash Player, or Silverlight), the intervals can be estimated by setting a timer to fire at periodic intervals (e.g., every 1 second). At each firing of the timer the current system time is recorded, and the time elapsed since the last firing is computed. If the time elapsed is greater than a given threshold (e.g., 10 seconds), an inference is made that the given elapsed time interval was spent in sleep or suspend mode.

Inferring Player Capability Information

The following are example player capabilities that impact the quality of the video experience: processing speed, video rendering capabilities, amount of memory available, and amount of bandwidth available.

Processing speed: The monitoring module can use the API of the content player, or the underlying platform to read the processing speed of the player. For example, if the content player is implemented on the Silverlight platform the monitor can use the Environment.ProcessorCount to obtain the count of the processors available.

For platforms whose API does not provide direct reading of processing speed capabilities, the monitoring module can derive it by using a timer to measure the time required to perform a fixed CPU-intensive computation.

Video rendering capabilities: Some content players have the ability to use hardware acceleration to render video. The monitoring module can determine the speed at which the content player can render video, either by using the API of the content player or the underlying platform. For example, a monitoring module using the Flash platform can use the flash.system.Capabilities.ScreenResolutionX to determine the screen resolution.

Available memory: The amount of available memory has a direct influence on how well the content player can support rendering video while performing the computation required for monitoring and other user-interaction tasks. The monitoring module can obtain the amount of available memory by using the API of the underlying platform. For example, a monitoring module using the Flash platform can use the API flash.system.System.totalMemory to determine how much memory is available.

Available download bandwidth: The available download bandwidth has a direct impact on the quality of the video stream that can be downloaded and played. The monitoring module can infer the available bandwidth by measuring the time interval it takes to download a fixed size file from the server. Alternatively, the underlying platform can provide API that can be used to determine the download bandwidth. For example, a player using the Flash platform can use the API flash.net.NetStreamInfo.currentBytesPerSecond.

Figure 4:
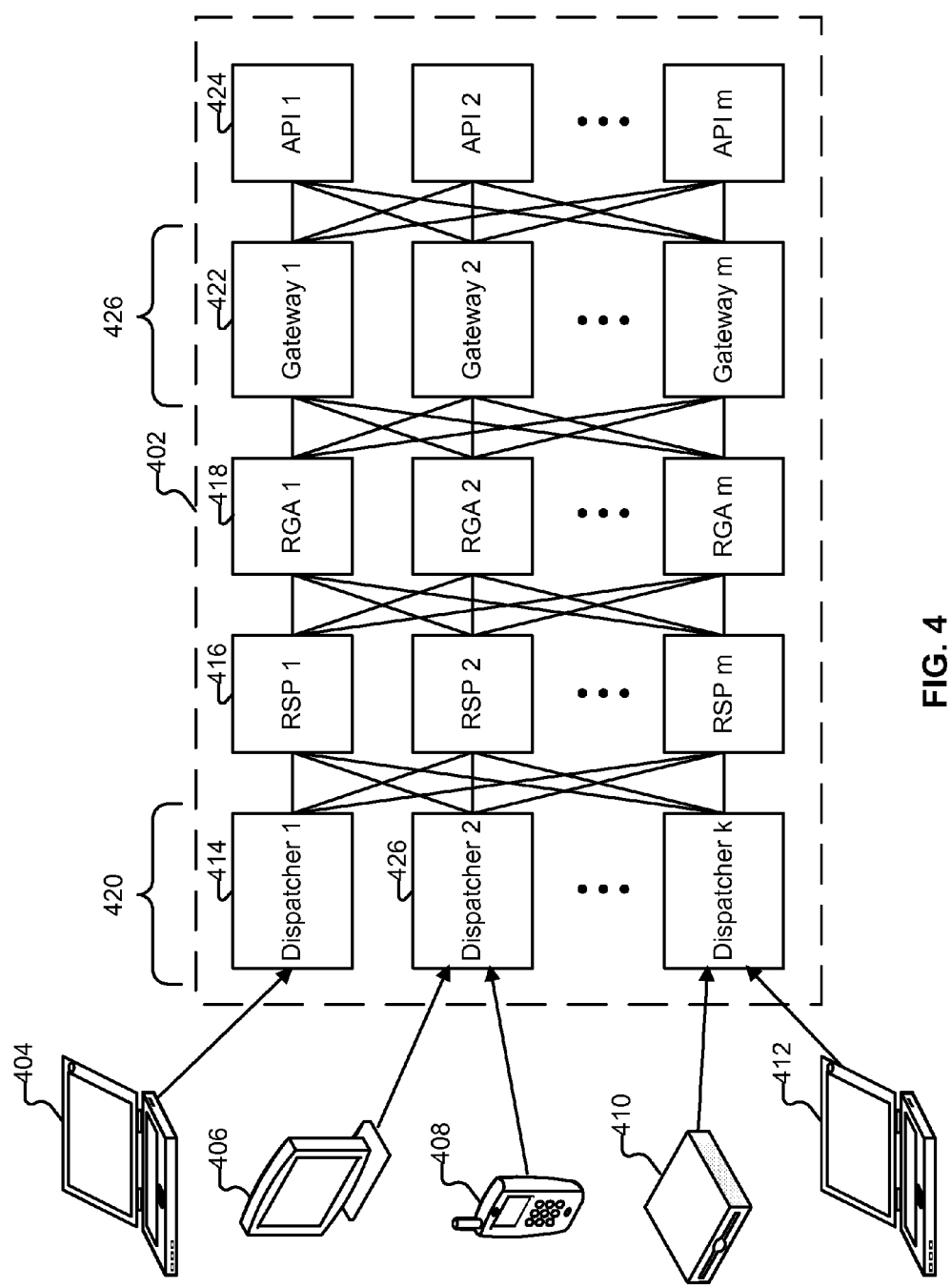
FIG. 4 is an illustration of an environment in which status information is received and processed.

FIG. 4 is an illustration of an environment in which status information is received and processed. In various embodiments, the services provided by content distribution monitor 102 are implemented across a scalable infrastructure, particularly in embodiments where telemetry data is received from all clients. In the example shown, the elements contained within dashed region 402 collectively provide the functionality of content distribution monitor 102. Each of the layers (e.g., dispatcher layer 420) is horizontally scalable and their respective components can be implemented on standard commercially available server hardware (e.g., having a multi-core processor, 4G+ of RAM, and Gigabit network interface adaptors) running a typical server-class operating system (e.g., Linux).

Clients 404-412 each include a monitoring module that collects status information. When the monitoring module on a client is activated, the client is mapped to a dispatcher server. As one example, when the monitoring module starts, it reads a configuration file that includes a list of dispatcher servers. The monitoring module selects a dispatcher server at random from the list.

A dispatcher server (414) includes two conceptual modules. The first module implements a communication interface for receiving status information from clients. In some embodiments the module is implemented using an off-the-shelf web server, and allows clients to connect over the HTTP protocol (and also allows clients to securely communicate via SSL). Data received by the first module is passed to the second module. The second module normalizes the data (to a format suitable for further processing) and passes the normalized data to a real-time stream processing component (416).

The real-time stream processing (RSP) layer includes an optimized software component that processes the telemetry data that it receives from the dispatcher in real-time. A dispatcher sends all heartbeats belonging to the same session to the same RSP component.

In some embodiments the RSP component is implemented as a continuously running service that reads and processes the telemetry data received from dispatchers via the network over TCP. The telemetry data stream comprises individual records, each of which represents the telemetry data sent by the monitoring module. The RSP component reads network data one record at a time and parses the data into a local data representation. The data received by the RSP component can be stored as in-memory hash tables of records allowing fast execution, and very high throughputs. Since the RSP component does not require old information, it can periodically purge the in-memory hash tables and increase scalability accordingly. In other embodiments, optimized in-memory databases are used.

A mapping function to map heartbeats having a session identifier "ID" to a particular RSP component "i" is as follows:

i=hash(ID) mod m, where hash( ) is a hash function and "m" is the total number of RSP components.

Once an RSP component parses the data records, it performs two main tasks. First, it performs data filtering. A filter is a logical expression and is installed at each RSP component instance. As one example, the following filter would identify viewers located in San Francisco, connected to ISP SP1, streaming from CDN A, one of two particular shows:

(city="San Francisco" AND ISP="SP1" AND CDN="CDN A" AND ((show="NewsAt10") OR (show="SundayMagazine"))

For each message of incoming telemetry data, the (key, value) pairs in the record are matched against the filter. If the filter is matched, the data is associated with the filter.

The second task performed is to compute snapshots and on-line statistics over the telemetry data matching each filter. One example of a snapshot is the number of players that are in a particular state (e.g., "playing"). The RSP component generates sequences of these snapshots (e.g., one every second). Examples of statistics computed by the RSP component include: the average number of bytes played over all video streams matching a filter over a given time interval (e.g., 10 seconds) and the minimum frames per second experienced by a stream matching a filter over a time interval. Snapshots and statistics are updated continuously, from new telemetry data received from clients.

The RSP component provides its computed snapshots and statistics to a real-time global aggregation component (418). The real-time global aggregation (RGA) component aggregates the information provided by the RSP component for each filter specified by a user.

As explained above, each RSP component (416) receives (via a dispatcher) telemetry data from a subset of the monitoring modules and calculates snapshots and statistics for all filters. Each RGA component instance is in turn responsible for a subset of the filters. Based on the identifier of the filter, all RSP components send data for that filter to a single RGA component. The RGA component combines the data from all RSP components for the filters that it is responsible for, resulting in a global snapshot and statistics based on information from all monitoring modules. Examples of aggregation operations performed by an RGA component include: counting the total number of viewers that match a particular filter, determining the percentage of viewers matching a given filter that are in buffering state, the join time distribution experienced by viewers joining a given stream, the current number of viewers in a given city, the rank of the most popular live events, and so on.

In some embodiments an RGA component's functionality is implemented as a continuously running service. It reads records sent by the RSPs asynchronously, thus achieving a high throughput. The RGA component stores the records it receives in in-memory hash tables allowing optimized access for real-time processing. Old information is periodically purged from the hash tables to improve efficiency.

As shown in FIG. 4, gateway 422 provides a web service API 424 for accessing data. Through the API, the RGA's data is available on a per-filter basis. In addition, it also exposes APIs to edit and install new filters and aggregation functions. In some embodiments gateway 422 is implemented using an off-the-shelf web server (such as Apache) with customized code to handle the various web service API calls. The handlers return data for a given web API call in various data formats including XML, JSON, SOAP, and HTML, as applicable. The handlers serve as middleware for querying and interactively controlling the RSPs and RGAs.

Gateway 422 also provides access controls and persistently stores the information regarding the API requests, data access and presentation policies, and filter descriptions. The information is maintained in a persistent database, such as mySQL or Oracle database.

Automatically Detecting and Resolving Content Distribution Problems

As explained above, content distribution monitor 102 aggregates telemetry information from all clients, processes the information, and makes available multi-dimensional results in real-time. Examples of dimensions include:

Client properties: Including browser type and version, player type and version, operating system, CPU speed, connection type, IP address, geographic location, language, autonomous system, and ISP.

Content properties: Including category, title, show, episode number, duration, encoding format, encoding quality, and language.

Content source properties: Including CDN, data center, and clients served.

User properties: Including whether the user (of the client) is a premium or free user, and returning or first-time visitor.

Using the techniques herein, real-time, granular information such as the quality experienced by viewers located in Denver, connected to SP2, and streaming videos from CDN B, using Flash Player 10 can be tracked. Further, by aggregating and correlating the data it receives from all clients, content distribution monitor 102 exposes, in real-time, the performance of content sources and network providers (ISPs). Problems in content delivery can be automatically detected by examining the results.

Figure 5:
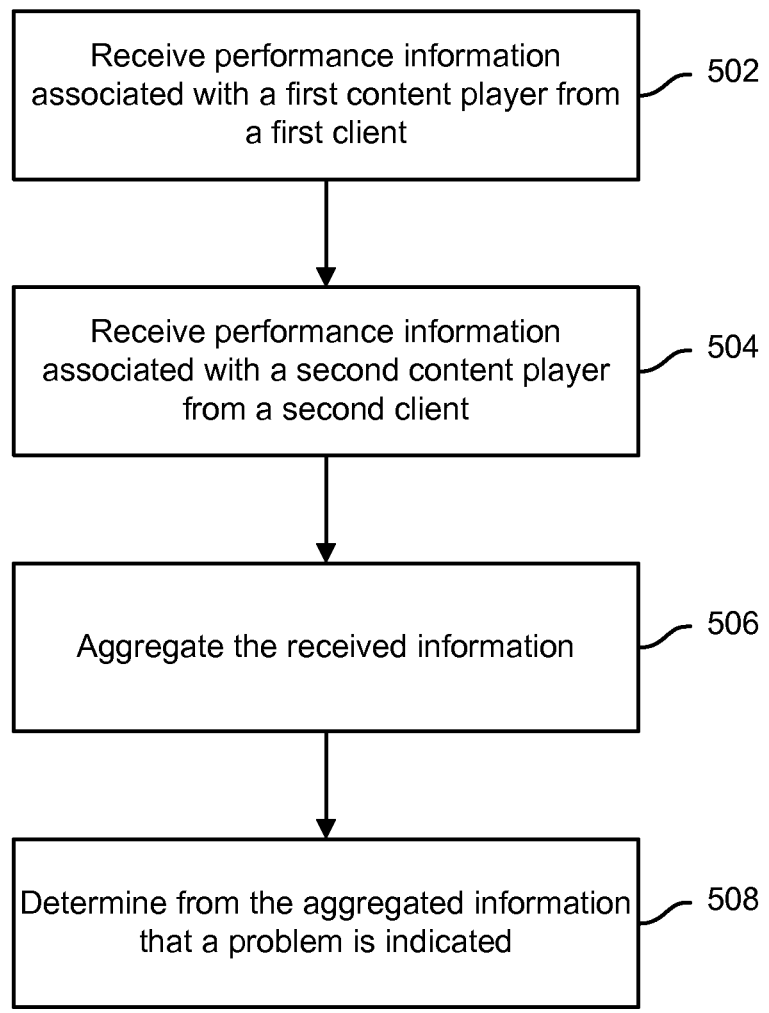
FIG. 5 illustrates an example of a process for detecting a problem in a content distribution.

FIG. 5 illustrates an example of a process for detecting a problem in a content distribution. In some embodiments the process shown in FIG. 5 is performed by content distribution monitor 102. The process begins when information associated with a first content player and a second content player is received from a first client (502) and second client (504), respectively. For example, at 502, telemetry information is received from client 404 by dispatcher 414. At 504, telemetry information is received from client 406 at dispatcher 426. At 506, the received information is aggregated. For example, at 506, distributed processing of the received data is performed by the RSP and RGA layers. Finally, at 508, a determination is made from the aggregate information that a content distribution problem is indicated. For example, at 508, gateway 422 determines that the CDN from which client 404 is obtaining content is experiencing a problem. Specific examples of analysis and diagnosis will now be given.

Example: Diagnosing Client Problems (Single Client, Single CDN)

Suppose a content owner, such as Studio-A, distributes its content via a single CDN, such as CDN C. Suppose that the content is encoded at multiple bitrates B1 and B2 where B1<B2. If a client A is able to sustain the download rate, but detects problems rendering the frames, an inference can be made that the client A likely has problems with its CPU utilization. An example of performing such an inference follows.

Observe the client buffer size over a period of time T (e.g., T=10 seconds) when the client is streaming at bitrate B2. Observe the rendering quality measured using dropped frames reported by the player. If the client buffer size is greater than B_threshold (e.g., B_threshold=0.5*B_max) at all times during the period of observation, and the rendering quality is less than R_threshold_1 (say, R_threshold_1=0.6), then a conclusion can be made that the client cannot sustain displaying bit-rate B2 due to CPU issues on the client.

Perform the same observation with the client playing at bitrate B1. If the client buffer size is greater than B_threshold (e.g., B_threshold=0.5*B_max) at all times during the period of observation, and the rendering quality is greater than R_threshold_2 (e.g., R_threshold_2=0.75), then a conclusion can be made that the client can sustain displaying bit-rate B1.

A numerical example is now provided. Consider a setting where a client streams a 1 Mbps stream for 10 seconds with buffer size varying between 9 and 10 seconds. Suppose that B_max is 10 seconds and B_threshold is 5 seconds. Assume that the rendering quality at 1 Mbps is 0.55 over this interval. When the client plays a 500 kbps stream instead, the buffer size is in the same range (9-10 seconds), but the rendering quality is 0.9 instead. Then, assuming that R_threshold_1=0.6 and R_threshold_1=0.75, a conclusion can be made that the client can sustain 500 kbps but not 1 Mbps.

Example: Diagnosing CDN Problems (Single Client, Two CDNs)

Suppose a content owner, such as Studio-A, distributes its content via two CDNs, such as CDN D and CDN E. If a client A is able to sustain the download rate from CDN D, but not CDN E, then the client can conclude that CDN E has problems streaming to client A. An example of performing such an inference follows.

Compute an aggregate quality metric Q using various measurements from the client over a time T (e.g., T=60 seconds). Examples of measurements which can be directly used as the metric Q across a group of clients over a time T include:

buffering ratio: The total number of seconds the client experienced buffering divided by the total playing time of the clients during interval of time T.

join time: The average joining time over all clients during time T over a group of clients.

join failures: The fraction of cases (across all attempts) where the join failed during time T.

If the quality Q is greater than a threshold T1 (e.g., T1=0.95) for CDN D, but lower than another threshold T2 (e.g., T2=0.50) for CDN E, then a conclusion can be made that CDN E has problems streaming to client A.

One example remedial action that can be taken at the client is to select CDN D for streaming the current stream, or use it first for future streams.

A numerical example is provided. Consider a setting where a client M streams from CDN D and experiences a buffering ratio of 0.5 over K1 attempts and time T1. Also, client M streams from CDN E, and over K2 attempts and time T2 experiences a buffering ratio of 0.02. In this case, given that K1 and K2 are above a threshold (e.g., both greater than 2), and T1 and T2 are above a threshold (e.g., both are greater than 10 minutes), a conclusion can be made that CDN D has problems streaming to the client. A further refinement can be performed by computing the buffering ratio for each of the K1 (or K2) streaming attempts from the CDNs to the client. In this case, it can be stated that CDN D has problems streaming to client M if more than 75% of the attempts from CDN D (out of the K1 attempts) have buffering ratio greater than 0.5, and more than 75% of the attempts from CDN D have buffering ratio less than 0.02.

Example: Two Clients in the Same Location Using Different ISPs Both Streaming from a Single CDN Suppose a content owner, such as Studio XYZ, distributes its content via a single CDN, such as CDN C. The CDN comprises several geographically distributed servers. As clients request content, they are assigned to a particular server based on their geographical location. If many clients at the same geographical location, but using different ISPs, experience quality problems, an inference can be made that the CDN servicing that geographical location is having a problem. Note that since XYZ also uses the services of CDN C, the experiences of clients obtaining XYZ's content from the same location can be included in the analysis. One way this analysis can be implemented on content distribution monitor 102 is as follows.

First, obtain location and network information for all clients. Examples of location information include city, state, country, DMZ code, and geographic coordinates. The location information can be obtained in a variety of ways, such as by providing the client's IP address to a geo-location service such as Quova. Also obtain network information such as Autonomous System Number (ASN) information and ISP information for the client.

Second, group clients based on their ASN and one geographic attribute, such as DMZ code, city, or state. Let G(ASN1, Geo1) denote the set of clients connected to a specific ASN, ASN1, which have the same geographic attribute value, Geo1.

Third, compute an aggregate quality Q for each group G(ASN, Geo) over last T seconds. Denote this aggregate quality by Q(G(ASN, Geo)). Examples of quality metrics are provided above.

Finally, for each Geo attribute value Geo1, check whether there are at least two group of clients connected via different ASNs. If the aggregate quality of a certain fraction F of the groups is greater than a threshold BufferingThreshold1, then conclude that the CDN is experiencing problems serving the clients at location Geo1. In some embodiments a minimum group size is defined so that only groups having a number of clients larger than a given threshold are considered. As one example, the fraction F is selected between 0.75 and 1.

A numerical example is now provided. Consider a system setting where BufferingThreshold1=0.1, MinGroupSize=200, and F=1.0. Based on an analysis of their IP addresses, 20,000 viewers are determined to be located in San Francisco, connected to CDN C, and watching a new release by Studio. Assume 5,000 clients are connected to ASN1 belonging to SP1; 5,000 clients are connected to ASN2 belonging to SP2; 9,900 clients are connected to ASN3 belonging to SP3; and 100 clients are connected to ASN4 which belongs to a wireless company. Four groups exist: G(SF, ASN1), G(SF, ASN2), G(SF, ASN3), and G(SF, ASN4), respectively.

Each client reports for each session (a) the total time it spent in buffering during every 10 second interval and (b) the total playing time during the same 10 second interval. For example, suppose a user Charlie has the IP address 1.2.3.4 which belongs to ASN1, and watches the stream with the URL rtmp://www.CDNC.example.com/12346/video.flv. Charlie reports in a particular heartbeat that he has experienced 1 second of buffering and 9 seconds of playing time. Another user, Bob, has the IP address 2.3.4.5 which belongs to ASN3, and watches the stream with the same URL. Bob reports in a particular heartbeat that he has experienced 0.5 seconds of buffering and 5 seconds of playing time. Bob's player spent the remaining 5 seconds in pause state. The pause time is not used in the computation of the buffering ratio.

Content distribution monitor 102 computes over each interval of time T=5 minutes, the aggregate average buffering ratio, defined as the (1) the total buffering time experienced by all sessions in a group during T divided by (2) the total playing time over all sessions in the group during the same time interval T. The aggregate quality ratio for each of the four groups is as follows:

$$Q(G(SF,ASN1))=0.14, Q(G(SF,ASN2))=0.21, Q(G(SF,ASN3))=0.18, Q(G(SF,ASN4))=0.04.$$

Since the number of clients in G(SF, ASN4) is less than MinGroupSize, the diagnosis analysis ignores this group. Also, since the buffering ratio of all remaining groups is greater than BufferingThreshold1, a conclusion is made that CDN C experiences quality issues serving clients in San Francisco.

Suppose the above example is modified such that ASN4 has 1000 clients, and Q(G(SF, ASN1))=0.02, Q(G(SF, ASN2))=0.21, Q(G(SF, ASN3))=0.18, Q(G(SF, ASN4))=0.04. In this case, an inference can be made that CDN C does not experience quality issues serving clients in San Francisco in general. The problem can then be narrowed down further and smaller or different sets of clients investigated, such as clients that are connected to ASN1 served by CDN C.

Example: Inferring Problems in a Particular ASN (Single CDN)

Suppose a content owner, such as Studio XYZ, distributes its content via a single CDN, such as CDN C. If the quality of clients at the same location but using different ISPs is very different, an inference can be made that the quality problems experienced by the clients are due to the ISP (and not due to the CDN). One way this analysis can be implemented on content distribution monitor 102 is as follows.

Perform the first three steps of the previous diagnosis (describing the diagnosis of CDN quality issues). As a final step, let G(ASN1, Geo1) be a group experiencing low quality. If there is at least another group, G(ASN2, Geo1) at the same location experiencing high quality, then conclude that ASN1 is the cause of quality issues. In particular, a conclusion that ASN2 has quality issues is reached if, and only if, Q(G(ASN2, Geo1))−Q(G(ASN1, Geo1))>BufferingRatioDiscrepancy.

A numerical example is now provided. Consider a system setting where BufferingRatioDiscrepancy=0.1. Suppose 5,000 viewers are determined to be located in New York, connected to ASN1, and streaming a baseball game from CDN C. Another 4,000 viewers in New York are connected to ASN2 and streaming the same game from CDN C.

Each client reports for each session (a) the total time it spent in buffering during every 10 second interval and (b) the total playing time during the same 10 second interval. The aggregate quality ratio for each group as computed by content distribution monitor 102 is: Q(G(NY, ASN1))=0.14, and Q(G(NY, ASN2))=0.03, respectively.

Since Q(G(SF, ASN1))−Q(G(SF, ASN2))>BufferRatioDiscrepancy, the quality issues are pinpointed as being ASN1.

Example: Inferring Problems with a Particular CDN (Multiple CDNs)

Suppose a content owner, such as XYZ, distributes its content via multiple CDNs (e.g., CDN A, CDN B, and CDN C). If clients at the same location and using the same ISP experience significantly different quality when connected to different CDNs, the difference in quality can be attributed to CDNs. One way this analysis can be implemented on content distribution monitor 102 is as follows.

First, obtain location and network information for all clients. Second, classify each client based on its ASN, the CDN it gets data from, and one of its geographic attributes (e.g., DMZ code, city, or state). Let $G(ASN_i, CDN1, Geo)$ denote the set of clients connected to a specific ASN and a geographic region (e.g., for i=1, 2, 3, 4, 5), getting data from the same CDN, CDN1. One way of determining the particular CDN from which a client is receiving content is to extract it from the URL used by the client to obtain the content.

Third, compute an aggregate quality Q for each group G(ASN, CDN, Geo) over the last T seconds. Denote this aggregate quality by Q(G(ASN, CDN, Geo)).

Finally, check whether there are at least K pairs of groups that share the same ASN and geo-location, but get their data from different CDNs, and which experience different quality. In particular, let G(ASN1, CDNi, Geo1) and G(ASN1, CDNj, Geo1) be one such pair of groups. Then if Q(G(ASNi, CDN1, Geoi))−Q(G(ASNi, CDN2, Geoi))>QualityThreshold2 for greater than a fraction F of the K pairs, a conclusion is made that CDN2 has problems serving clients in general across a large set of regions. Alternatively, if this happens for smaller than a fraction F but a non-zero set, then a conclusion can be made that CDN2 has problems serving those (ASN, Geo) combinations for which the difference in quality exceeds the quality threshold.

In some embodiments, a minimum group size is defined so that only groups having a number of clients larger than a given threshold are considered.

A numerical example is provided. Content owner Charlie's Studio uses CDNs A and B for delivering content. At some point, there are 1100 streams from ISP-1 in San Francisco, 1200 streams from ISP-2 in Los Angeles, 1500 streams from ISP-3 in New York, 1050 streams from ISP-4 in Boston, and 600 streams from ISP-1 in Denver, with exactly half the users in each group streaming from CDN A and the other half from CDN B. A minimum group size of 500 users streaming from a particular (ASN, CDN, Geo) group is used, and hence there are four groups to consider. A requirement of at least four pairs (K=4) exists. For CDN A, the buffering ratios for users in San Francisco, Los Angeles, and Boston is 0.3, and for users in Denver it is 0.1. For CDN B, the buffering ratio of all user groups is 0.05. The quality threshold to separate good and bad quality is 0.1, and the fraction F required is 75%. This condition is satisfied, since three out of the four groups have a quality difference between CDN A and CDN B as 0.25. Hence, a conclusion is made that CDN A is having problems streaming to users.

Example: Multiple CDNs with CDN Optimization

Suppose a content owner, such as XYZ, distributes its content via multiple CDNs (e.g., CDN A, CDN B, and CDN C). Assume that if a client connected to CDN A experiences buffering beyond a threshold, it switches to another CDN (and stays there for at least a threshold interval of time). Based on the amount of switching observed from a CDN, the relative extent of quality problems the CDNs have can be quantified. One way this analysis can be implemented on content distribution monitor 102 is as follows.

For each CDNi for a period T, determine the number of clients Ni that start with CDNi, and the number of clients Mi that start with CDNi and switch away from CDNi (i.e., count only the first switch of a client). Compute the switch fraction SWi=Mi/Ni for all CDNs. If (SWi−avg(SW)>SW_Threshold). A conclusion can be made that CDNi has quality problems in general. Similar analysis can also be performed with respect to a geographic region or an ASN restriction.

A numerical example is provided. A content owner Charlie's Studios uses CDN A and CDN B to deliver content. Over a 10-minute period, 10,000 users watch content starting streaming from CDN A, and in the course of viewing, 1000 users switch to CDN B based on a client-based quality detection algorithm. In the same period, 10,000 users watch the same content starting streaming from CDN B, and out of these, 2,500 switch to CDN B. The switch fraction for CDN A is 0.1 and that for CDN B is 0.25. Switching threshold SW_Threshold is 0.1, and a conclusion is made that CDN A has quality problems in general.

Other content distribution problems can also be detected using the techniques described herein. For example, a problem with a content item itself (e.g., a particular movie) can be inferred if several clients, using different CDNs and different ISPs, experience quality issues with the same content. As another example, a problem with ad server 150 can be inferred if several clients report excessively long advertisement load times or timeouts.

A numerical example is provided. A content owner publishes 100 clips daily using two CDNs: CDN A and CDN B. One of the clips, clip X, has 100% join failures on both CDNs. Using this information, an inference can be made that there is a problem in publishing clip X. Now assume that there is 100% join failure for clients that join CDN A, but <2% of the users have problems with CDN B. Then an inference can be made that CDN A's publishing path has problems for that clip (but CDN B's does not).

Other content distribution problems can also be detected using the techniques described herein. For example, a problem with a content item itself (e.g., a particular movie) can be inferred if several clients, using different CDNs and different ISPs, experience quality issues with the same content. As another example, a problem with ad server 150 can be inferred if several clients report excessively long advertisement load times or timeouts.

In various embodiments, when problems are detected by content distribution monitor 102, corrective actions are automatically taken, such as by a control module included in content distribution monitor 102, or by a separate control system, configured to work in conjunction with content distribution monitor 102.

Dynamic Client Logging and Reporting

As mentioned above, the logging and reporting performed by a client can be dynamically adjusted based on a variety of parameters. Four such example parameters are as follows:

(1) Triggering Event ("Trigger"): The decision to dynamically adjust logging/reporting can be based on the occurrence of a triggering event. As one example, if a particular error occurs at a client, the verbosity of the status information sent by the client to the content distribution monitor can be increased from one level to another. As another example, if a performance metric (e.g., CPU usage or number of buffering events) indicates that the client is experiencing poor performance, the verbosity of the status information can be increased. If a client that was previously experiencing performance has recovered, the improvement in a performance metric can similarly be used to decrease the verbosity of the status information.

(2) Deciding Component ("Decider"): The decision to dynamically adjust logging/reporting can be made by the client, by the content distribution monitor, or both devices working in cooperation. For example, suppose clients in a particular geographical region are experiencing a sudden reduction in bandwidth. Content distribution monitor 102 can instruct a subset of clients in that geographical region to provide additional information and/or to provide information more frequently.

When a decision to make a dynamic adjustment to logging/reporting is made solely by the client, it is possible that a systemic issue could result in the content distribution monitor being overwhelmed by the increased data (e.g., where all clients suddenly increase their reporting levels). One approach to preventing this from occurring is for each client to request permission from the monitor prior to sending more verbose information (or sending the information more frequently). The monitor can then enforce a limit on the number of clients it allows to increase their verbosity levels. A second approach is for each client to generate a random number, and only increase verbosity/frequency if the random number falls within a particular range.

(3) Client Subset ("Who"): A subset of clients that experience a particular problem can be selected to send full logging information to diagnose the problem. For example, a diverse geographic or ISP spread can be selected to help diagnose a problem with distribution of a video stream and a diverse content spread can be used to help diagnose a content publishing problem. Similarly, clients across a spread of CDNs can be instructed to increase their reporting levels to learn more information helpful in diagnosing CDN issues.

(4) Contents ("What"): The level of detail to be used when sending information by a client to the monitor can be identified using verbosity levels. Lower verbosity levels can be used to provide typical status information or indicate the occurrence of problems, while higher verbosity levels can be used to provide details usable to diagnose and correct the problem. Different modules can be instructed to adjust their verbosity levels independently. For example, suppose a video application comprises a network connection management module, a video streaming protocol module, a video decoding module, a video rendering module, and a user interface module. When a problem is encountered, one or more individual modules implicated in the problem can have their verbosity levels increased.

The time range of the contents reported by the client to the monitor can also be adjusted dynamically. While in some cases diagnosing a problem will require only the logs collected after the problem has manifested, in other cases, diagnosing the problem may require logs that precede the manifestation of the problem. Accordingly, clients can be configured to store information (at least temporarily) with greater verbosity than is sent to the monitor, and can, upon request, retroactively supply the more detailed information.

Various examples of problem diagnosis using dynamic adjustments to client logging and reporting will now be provided.

Dynamic Adjustment Example 1: Clients Experience Poor Buffering Performance

In video streaming, buffering is a significant performance issue. It can thus be important to understand the exact causes of buffering.

Solution A: Trigger=Threshold; Decider=Joint; Who=Subset; What=Past and Current.

One approach to diagnosing buffering is to let each client determine that it is buffering and request permission to send the monitor more detailed logs to help isolate the cause of buffering for the client. The monitor decides whether to allow a given client to send more detailed logs or not based on the number of other clients currently logging detailed logs.

One example of this solution is to configure a threshold for buffering by using a metric called a "buffering ratio." The buffering ratio is the percent of time that a player is in a buffering state (as opposed to a playing state). If the buffering ratio exceeds the threshold, the client will trigger the request to send more detailed logs. In some embodiments, the state of the player for the past five minutes is considered to accurately capture the current state of the player and not react to brief spikes in buffering. An example threshold for a buffering ratio is 2%, meaning that if more than 2% of the time in the last five minutes (i.e., more than six seconds) was spent in a buffering state, the client requests to send more detailed information to the monitor. The monitor will accept the request only if it has sufficient capacity to handle the additional log information. One way to accomplish this is to configure a threshold for the maximum number of concurrent clients that can send detailed logs. If the current number is less than the threshold, the client sending the request is allowed to send more detailed log information. The requesting client then sends detailed information starting from that point on and including information about the past five minutes. In this example, five minutes of data is sent because it corresponds to the window of time used in the buffering ratio calculation.

Solution B: Trigger=Threshold; Decider=Monitor; Who=Subset; What=Past and Current.

A second approach to diagnosing buffering is for all clients to send their player state (e.g., "buffering" or "playing") to the monitor and for the monitor to decide when and which clients should send detailed log information.

One example of this solution again uses the buffering ratio metric. However, in this case the threshold is set and evaluated by the monitor. The monitor evaluates the buffering ratio of each client and decides which clients should send detailed logs. Within this decision the monitor will take into account the capacity of the monitor to handle the logs using the maximum concurrent client threshold as before. For example, suppose the monitor can handle verbose log information from a total of 100 clients and the monitor determines that 200 clients have a buffer ratio that exceeds the threshold (or, their respective thresholds, in an embodiment where different clients have different thresholds). The monitor will then select a subset of 100 of the clients and send them a message to request detailed log information. The subset of clients can be selected randomly and can also be selected based on additional criteria, for example so that several geographies and ISPs are included, to get a regional spread, and/or so that the 100 clients selected obtain content from diverse CDNs.

Dynamic Adjustment Example 2: Clients are in an Error State

Certain errors are very good indicators of problems in an application. For example, in a Flash-based video streaming application, the error NetStream.StreamNoFound is a clear indication of a problem with retrieving a video asset from a CDN server. This error says that the CDN server does not have the video asset being requested. The root cause of this may be a distribution problem within the CDN where the asset does not get distributed to all the servers or a publishing problem where the asset is not published to the CDN. When the error occurs, knowing: (1) the location of the clients, (2) the time, (3) the asset name or identifier, and (4) CDN or CDN server's IP that returned the error are very useful in resolving the problem.

Solution: Trigger=Errors; Decider=Joint; Who=Subset; What=Current.

One approach to resolving errors is for the client to store detailed information about the error locally and also to request permission to send detailed information to the monitor. Based on factors such as the number of clients requesting to send detailed log information and the type of issues encountered by a particular client, the monitor can allow a given client to provide more detailed data. As with the previous example, secondary considerations such as what content is being consumed and where the client is located can be used when determining whether a given client should provide detailed information to the monitor. Once a client receives a response from the monitor affirming that additional log information should be provided, the client will send the detailed information about the error. In various embodiments, the client continues to send detailed log information until it exits the error state.

Dynamic Adjustment Example 3: Clients Experience Failed Player Actions

An example of a player action is a request by a user to switch from a compact mode to a full screen mode. Failures in player actions can be very annoying to the viewer and can cause viewers to navigate away from a site (in the case of web-based viewing) or close the player application (in the case of a standalone application).

Solution: Trigger=Error; Decider=Joint; Who=Subset; What=Past and Current.

One way to resolve player action problems is for the client, upon detection of the error, to request permission from the monitor to send detailed log information about the failure. In the case of diagnosing why a user action to "go to full screen mode" failed, any errors that occurred while attempting to switch to full screen mode, and any previous actions that were taken, will be of interest.

One example of this solution is for the client to continuously store and update the user actions taken in the last five minutes, as well as the internal player state. The client sends a request to the monitor to log the information when a user action such as "go to full screen" mode fails. If the monitor responds positively, the client sends the past five minutes of information it has stored.

Dynamic Adjustment Example 4: Clients Exhibit Similar Characteristic/Behavior In addition to individual client problems, global and regional problems can also occur. For example, suppose all viewers in the New York City area have a high buffering ratio.

Solution: Trigger=Threshold; Decider=Monitor; Who=Subset; What=Current.

The monitor sees the performance of a large number of clients across a wide variety of locations, machine types, etc. One way to implement regional problem isolation and diagnosis is as follows. High-level aggregate quality metrics can be used to localize buffering issues to a subset of clients. For example, a ratio of clients who have experienced buffering of more than a few seconds to users who did not have much buffering can be used to construct a high level metric to quantify the experience of viewers. In this scenario, a client that experienced more than five seconds of buffering is denoted as having a low quality experience. A threshold of 5% can be used for the ratio of clients having a low quality experience vs. other clients. The threshold implies that if more than 5% of the viewers are experiencing low quality, it is likely that there is a wide spread systemic root cause.

Telemetry data can be grouped with respect to different dimensions, and principal component analysis can be performed on the data. In doing so, subsets of clients that are experiencing quality issues can be discovered. Example dimensions for classifying clients include: geolocation of clients (indicating a geolocalized problem), ISP used by end users for connecting to the Internet (indicating a problem with access link of viewers), CDN servers that the clients connect to (indicating an issue with the server from which the video is being downloaded), and browser type or operating system of the viewer (indicating a problem with the end user's software).

High level metrics, such as geolocation, ISP, and CDN information correlate well with network related issues. Using the metrics to group clients and perform principal component analysis can help localize a low quality client experience to a subset of affected viewers which share certain attributes. However, once the subset of affected clients has been determined, additional information may be needed to further diagnose the issue and find the root cause of the problem that is resulting in the deterioration of quality of the users. In such a scenario, the monitor can issue a command to a subset of clients (e.g., identified by specific attributes) to send additional information. Examples of such additional information include (a) higher fidelity measurements, for example higher frequency measurement of the download rates (by looking at bytes downloaded); (b) computed correlations and trends of measurements, for example, information representing trends of the buffer lengths; and (c) measurements that might typically not otherwise be taken, such as a sequence of dropped frames. In some embodiments, the monitor drills down into the detailed data by iteratively sending commands to clients for increasingly detailed information.

Dynamic Adjustment Example 5: Fatal Error

In a video streaming application, failure to start playing video is an example of a fatal error.
Solution: Trigger=Error; Decider=Monitor; Who=Subset; What=Past and Current.
Successfully diagnosing client side issues such as fatal errors can require detailed information from the client, including past events.
One approach to diagnosing fatal errors is for the client to inform the monitor that a fatal error has occurred. Based on knowledge of how to diagnose the particular error, the monitor can request specific information. For example, the information could include all errors that occurred, the state transitions that occurred during the join phase, and any configuration files that were downloaded.
Further, past information can be summarized to reduce the amount of data transmitted. For example, (1) counts of error codes can be sent instead of listing each error code; (2) measured data can be sent at a lower frequency (e.g., one sample every ten seconds instead of five samples per second); and (3) statistics over the data, such as averages, variances, and distributions can be sent.

Dynamic Adjustment Example 6: Predefined Schedule

In some cases, such as the start of a football game, a particularly large number of clients may be expected to initiate the consumption of content.
Solution: Trigger=Schedule; Decider=Monitor; Who=Subset; What=Current.
When it is anticipated that an event will draw more viewers than usual, and/or when the content being served is of particular importance, certain clients can be instructed to provide detailed log information, even if they have not yet experienced any problems.
In some embodiments, monitor 102 is configured to instruct certain clients to provide detailed log information in accordance with a schedule. Clients periodically poll the monitor to find out whether they should send detailed logs or not. Based on the schedule, the monitor will respond to each client with either a negative response (meaning it should not send detailed logs) or a positive response with predefined keywords specifying which additional information to send. Examples of keywords are: (1) "bit rate"—send information about bit rate and bit rate switches, (2) "buffering"—send information about buffering events and buffer length changes, (3) "available bandwidth"—send information about the current available bandwidth and continuous measurements to track the trend, and (4) "user actions"— send all actions by the user, such as full screen toggle and any errors that resulted from them. The monitor can send multiple keywords to the same client, and/or send different combinations of keywords to different clients.

As another example, and irrespective of whether the content being delivered implicates a planned increase in viewers, monitor 102 can instruct certain clients that are not experiencing problems to provide additional information. In particular, monitor 102 can randomly select 100 clients, once an hour, to send detailed log information. So, in a first hour, client 404 might be instructed to provide detailed information, and in a second hour, client 408 might be instructed to provide detailed information.

Dynamic Adjustment Example 7: Version Upgrade

Software version updates happen frequently and in most cases the final stage of testing a software version update is by releasing it to a portion of the production users.
Solution: Trigger=Schedule; Decider=Monitor; Who=Subset; What=Current.
The ability to request detailed logs from a subset of the users who get a new version can be useful to ensure that the new version is performing as expected. For example, suppose a new software version is deployed to 5% of an audience. Detailed logs can be requested from 10% (or 0.5% of the overall audience) of the clients with the new version.
In some embodiments, monitor 102 receives periodic messages from each client that include the client's current software version. When a software update is released, the monitor tracks a portion of the clients with the new version by requesting that those clients send detailed logs. The portion can be determined as a percentage of the new client and/or can be limited by a fixed number of slots. Once the new software release has been verified, the server can stop collecting detailed logs from clients running the new software.

Dynamic Adjustment Example 8: Customer Service

Subscription-based services typically engage customer call centers to provide customer support. When a user of a content streaming application has an issue, it can be advantageous for a customer support representative to be able to receive detailed information pertinent to diagnosing the problem.
Solution: Trigger=Error; Decider=Monitor; Who=Specific Client; What=Past or Past and Current.
In various embodiments, customer support representatives are able to request a caller's client to send detailed information about the specific problem reported by the caller in real-time. If the caller is complaining about buffering, the detailed information requested can include higher fidelity measurements of the download rates, buffering and buffer length, the current bit rate and recent bit rate switches, and the client's capabilities and performance. If the caller is complaining about blank video, the detailed information requested can include errors, player state transitions during join, and configuration files. If the caller is complaining about a frozen player, the detailed information requested can include a stack trace and recent user actions. As a final example, if the caller is complaining about a low bitrate, the detailed information requested can include fine-grained bandwidth measurements, CPU measurements, and memory measurements. The requested detail can also be adjusted by the customer service representative to iteratively diagnose the problem.
One example of this solution is to provide a console to the call center representative that allows him to identify the caller's client and request that it send specific information. One way to perform the identification is through the use of a login ID (e.g., the user's email address). The user provides the login ID to the customer service representative, and the client also includes the login ID in heartbeats. The console matches the login ID entered by the representative with the client sending the same login ID. The representative then specifies the information to be requested from the client based on the problem described by the caller.

Figure 6:
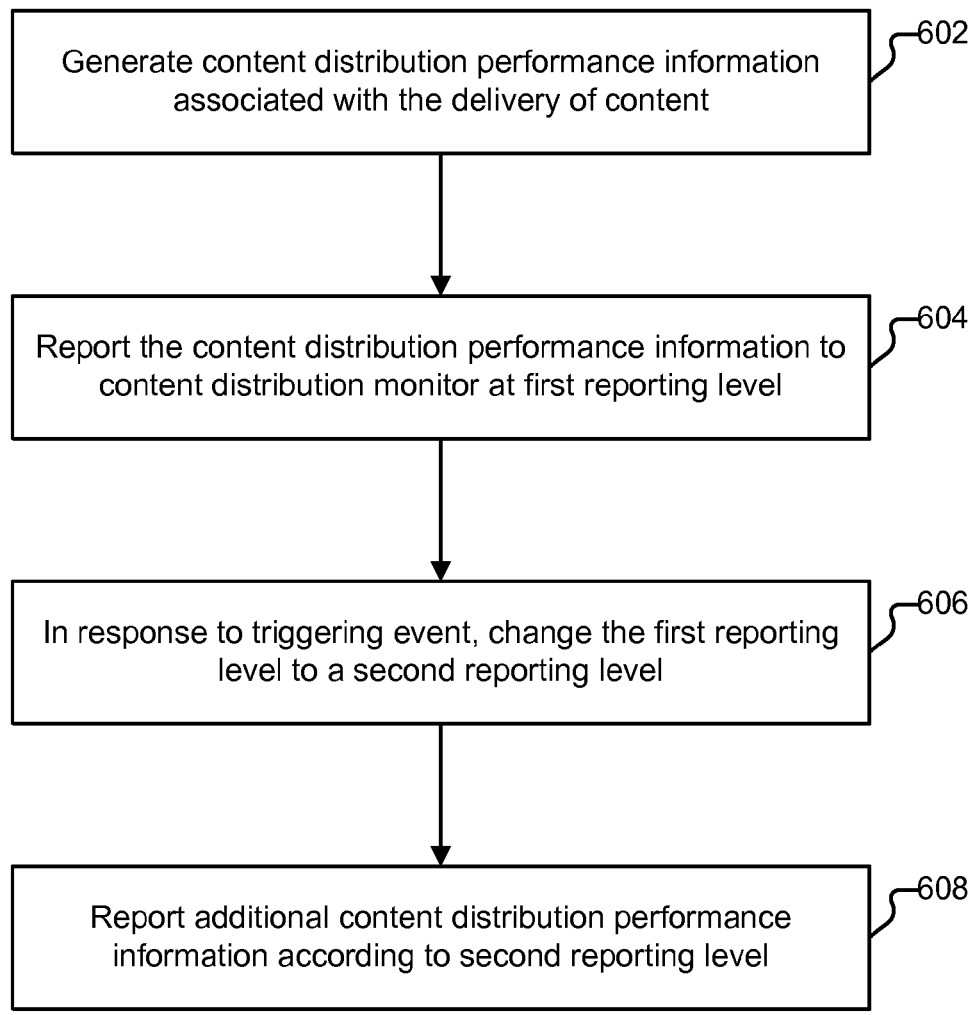
FIG. 6 illustrates an example of a process for dynamically adjusting a heartbeat.

Example Processes for Performing Dynamic Adjustment to Client Logging and Reporting FIG. 6 illustrates an example of a process for dynamically adjusting a heartbeat. In some embodiments the process shown in FIG. 6 is performed by a client such as client 172. The process begins at 602 when content distribution performance information associated with the delivery of content is generated. As one example, at 602 client 172 captures telemetry data and formats it into a heartbeat message.

At 604, the content distribution performance information is reported to a content distribution monitor at a first reporting level. As one example, at 604, client 172 sends minimal status information to monitor 102 (e.g., indicating the client version and client state, only).

At 606, in response to a triggering event, the first reporting level is changed to a second reporting level. One example of a triggering event is the client experiencing a performance degradation. Another example of a triggering event is the client encountering an error. Yet another example of a triggering event is the client receiving an external instruction, such as from monitor 102, to adjust the reporting level.

Finally, at 608 additional content distribution performance information is reported according to the second reporting level. As one example, at 608, client 172 provides detailed log information to monitor 102. In various embodiments, if the client is unable to connect with monitor 102, the client stores the content distribution performance information for delivery to monitor 102 once the connection is restored.

Figure 7:
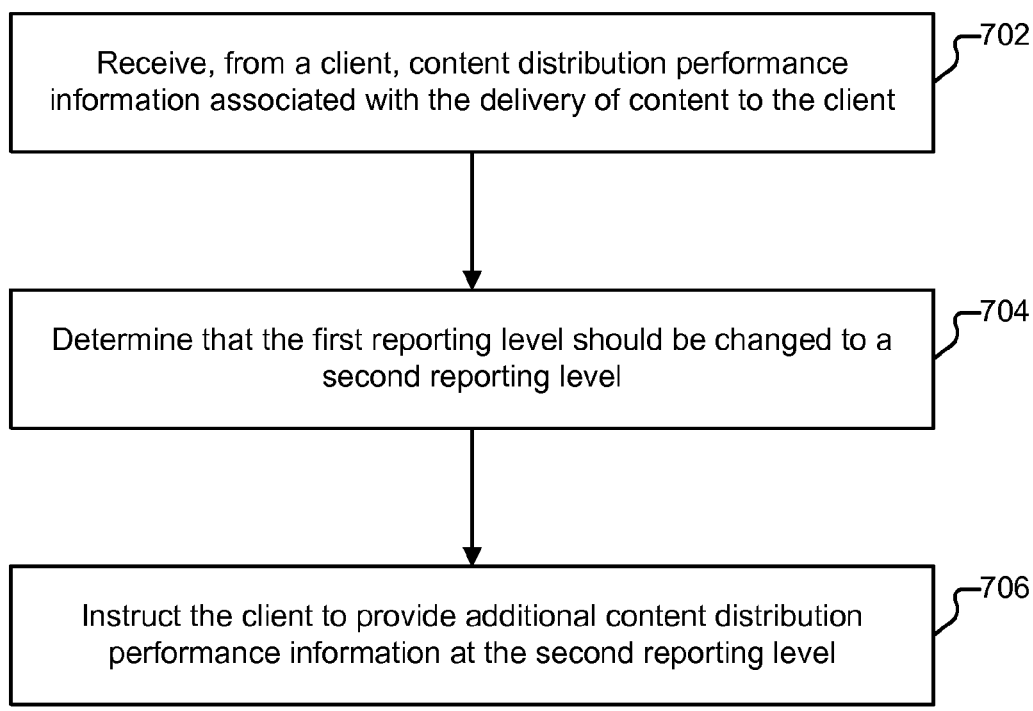
FIG. 7 illustrates an example of a process for dynamically adjusting a heartbeat.

FIG. 7 illustrates an example of a process for dynamically adjusting a heartbeat. In some embodiments the process shown in FIG. 7 is performed by monitor 102. The process begins at 702 when content distribution performance information associated with the delivery of content is received from a client. As one example, at 702, monitor 102 receives the heartbeat information sent by client 172 at 604.

At 704, a determination is made that the first reporting level should be changed to a second reporting level. As one example, monitor 102 determines that a client is experiencing a degradation of performance. As another example, at 704 monitor 102 randomly selects client 172 to provide more information. As yet another example, at 704 monitor 102 determines that a problem has been resolved for a client currently providing verbose log information.

Finally, at 706 monitor 102 instructs client 172 to provide additional content distribution performance information at a second reporting level. As one example, at 706, monitor 102 instructs client 172 to provide its bitrate and its available memory to monitor 102, in addition to the information it provided at 604 in the process shown in FIG. 6. As another example, at 706 monitor 102 instructs a client that was previously providing verbose log information to stop doing so (e.g., because the problem has been resolved).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
generate content distribution performance information associated with a delivery of content;
report the content distribution performance information to a remote content distribution monitor at a first reporting level, wherein the first reporting level is associated with a minimal level of information;
based at least in part on an external instruction provided by the remote content distribution monitor, change the first reporting level to a second reporting level; and
report additional content distribution performance information according to the second reporting level, wherein the second reporting level is associated with more detailed information than the first reporting level; and
wherein a plurality of clients are configured to provide content distribution performance information at the first reporting level, wherein a subset of the clients in the plurality of clients are selected, based at least in part on an evaluation by the remote content distribution monitor of at least a portion of the content distribution performance information at the first reporting level provided by the plurality of clients, to provide additional information at the second reporting level, and wherein instructions are provided by the remote content distribution monitor to the subset of clients selected based at least in part on the evaluation of the at least portion of the content distribution performance information at the first reporting level provided by the plurality of clients; and
a memory coupled to the one or more processors and configured to provide the one or more processors with instructions.

2. The system of claim 1 wherein the content distribution performance information reported at the first reporting level includes information obtained from a first and second module included in the system, and wherein reporting information at the second reporting level includes increasing the verbosity of information reported regarding the second module and not increasing the verbosity of information reported regarding the first module.

3. The system of claim 1 wherein the first reporting level corresponds to a first predefined log level and wherein the second reporting level corresponds to a second predefined log level.

4. The system of claim 1 wherein reporting the additional content distribution performance information includes reporting information generated while the system was reporting to the remote content distribution monitor at the first reporting level.

5. The system of claim 1 wherein the external instruction is provided by the remote content distribution monitor based at least in part on a performance metric exceeding a threshold.

6. The system of claim 1 wherein the content comprises a video stream.

7. The system of claim 1 wherein the content comprises an advertisement.

8. The system of claim 1 wherein the system is a first system and wherein the external instruction is provided by the remote content distribution monitor based at least in part on a second system failing to connect.

9. The system of claim 1 wherein the additional content distribution performance information comprises a summary of a buffering state.

10. A method, comprising:
generating content distribution performance information associated with a delivery of content;
reporting the content distribution performance information to a remote content distribution monitor at a first reporting level, wherein the first reporting level is associated with a minimal level of information;
based at least in part on an external instruction provided by the remote content distribution monitor, changing the first reporting level to a second reporting level; and
reporting additional content distribution performance information according to the second reporting level, wherein the second reporting level is associated with more detailed information than the first reporting level; and
wherein a plurality of clients are configured to provide content distribution performance information at the first reporting level, wherein a subset of the clients in the plurality of clients are selected, based at least in part on an evaluation by the remote content distribution monitor of at least a portion of the content distribution performance information at the first reporting level provided by the plurality of clients, to provide additional information at the second reporting level, and wherein instructions are provided by the remote content distribution monitor to the subset of clients selected based at least in part on the evaluation of the at least portion of the content distribution performance information at the first reporting level provided by the plurality of clients.

11. A computer program product embodied in a non-transitory computer readable storage medium and comprising computer instructions for:
generating content distribution performance information associated with a delivery of content;
reporting the content distribution performance information to a remote content distribution monitor at a first reporting level, wherein the first reporting level is associated with a minimal level of information;
based at least in part on an external instruction provided by the remote content distribution monitor, changing the first reporting level to a second reporting level; and
reporting additional content distribution performance information according to the second reporting level, wherein the second reporting level is associated with more detailed information than the first reporting level; and
wherein a plurality of clients are configured to provide content distribution performance information at the first reporting level, wherein a subset of the clients in the plurality of clients are selected, based at least in part on an evaluation by the remote content distribution monitor of at least a portion of the content distribution performance information at the first reporting level provided by the plurality of clients, to provide additional information at the second reporting level, and wherein instructions are provided by the remote content distribution monitor to the subset of clients selected based at least in part on the evaluation of the at least portion of the content distribution performance information at the first reporting level provided by the plurality of clients.

12. A system, comprising:
a processor configured to:
receive, from a plurality of remote clients, content distribution performance information associated with a delivery of content to the remote clients, wherein the content distribution performance information is received in accordance with a first reporting level, and wherein the first reporting level is associated with a minimal level of information;
select, based at least in part on an evaluation of at least a portion of the content distribution performance information received in accordance with the first reporting level, a subset of the remote clients in the plurality of remote clients to provide additional content distribution performance information in accordance with a second reporting level; and
transmit, to the selected subset of remote clients, instructions to report the additional content distribution performance information in accordance with the second reporting level, wherein a remote client in the selected subset of remote clients is configured, based at least in part on a transmitted instruction, to change the first reporting level to the second reporting level; and
a memory coupled to the processor and configured to provide the processor with instructions.

13. The system of claim 1 wherein the subset of remote clients in the plurality of remote clients is selected based on one or more criteria including geography, associated Internet Service Provider (ISP), and associated Content Delivery Network (CDN).

14. The system of claim 1 wherein the subset of remote clients in the plurality of clients is selected based at least in part on a threshold number of concurrent clients allowed to send information at the second reporting level.

15. The system of claim 12 wherein the subset of remote clients in the plurality of remote clients is selected based on one or more criteria including geography, associated Internet Service Provider (ISP), and associated Content Delivery Network (CDN).

16. The system of claim 12 wherein the subset of remote clients in the plurality of remote clients is selected based at least in part on a threshold number of concurrent clients allowed to send information at the second reporting level.

* * * * *

UNITED STATES PATENT AND TRADEMARK OFFICE
CERTIFICATE OF CORRECTION

| | | |
|---|---|---|
| PATENT NO. | : 9,819,566 B1 | Page 1 of 1 |
| APPLICATION NO. | : 13/461346 | |
| DATED | : November 14, 2017 | |
| INVENTOR(S) | : Aditya Ravikumar Ganjam et al. | |

It is certified that error appears in the above-identified patent and that said Letters Patent is hereby corrected as shown below:

In the Specification

In Column 5, Line 26, after "ConvivaNetStream( )", insert --;--.
In Column 5, Line 39, after "NetStream( )", insert --;--.
In Column 5, Line 45, after ""NetStream"", insert --:--.
In Column 5, Line 47, after "NetStream( )", insert --;--.
In Column 5, Line 57, after "NetStream( )", insert --;--.
In Column 17, Line 42, delete "Geo" and insert --Geo$_i$--, therefor.

Signed and Sealed this
Twenty-second Day of May, 2018

Andrei Iancu
*Director of the United States Patent and Trademark Office*